United States Patent
Zhu

(10) Patent No.: US 10,182,092 B2
(45) Date of Patent: Jan. 15, 2019

(54) MEDIA DATA TRANSMISSION METHOD AND DEVICE

(71) Applicant: Huawei Device (Shenzhen) Co., Ltd., Shenzhen (CN)

(72) Inventor: Yu Zhu, Shenzhen (CN)

(73) Assignee: HUAWEI DEVICE (SHENZHEN) CO., LTD., Shenzhen (CN)

( * ) Notice: Subject to any disclaimer, the term of this patent is extended or adjusted under 35 U.S.C. 154(b) by 191 days.

(21) Appl. No.: 15/026,076

(22) PCT Filed: Sep. 30, 2013

(86) PCT No.: PCT/CN2013/084729
§ 371 (c)(1),
(2) Date: Mar. 30, 2016

(87) PCT Pub. No.: WO2015/042961
PCT Pub. Date: Apr. 2, 2015

(65) Prior Publication Data
US 2016/0241620 A1 Aug. 18, 2016

(51) Int. Cl.
*G06F 15/16* (2006.01)
*H04L 29/06* (2006.01)
(Continued)

(52) U.S. Cl.
CPC ............ *H04L 65/60* (2013.01); *H04L 12/281* (2013.01); *H04L 12/2812* (2013.01);
(Continued)

(58) Field of Classification Search
CPC ... H04L 65/60; H04L 12/281; H04L 12/2812; H04L 2012/2841; H04L 2012/2849
See application file for complete search history.

(56) References Cited

U.S. PATENT DOCUMENTS 8,594,050 B2 * 11/2013 Kesselman ........... H04W 88/06
370/327
9,014,738 B2 * 4/2015 Gebert .................. H04W 76/10
455/509
(Continued)

FOREIGN PATENT DOCUMENTS

CN 101300871 A 11/2008
CN 101325595 A 12/2008
(Continued)

OTHER PUBLICATIONS

Foreign Communication From a Counterpart Application, European Application No. 13894267.7, European Office Action dated May 24, 2017, 8 pages.
(Continued)

*Primary Examiner* — Moustafa M Meky
(74) *Attorney, Agent, or Firm* — Conley Rose, P.C.

(57) ABSTRACT

Embodiments of the present disclosure provide a media data transmission method and a device. The method is mainly used to, when there is media data suitable for transmission by using a first frequency band, control a media source device and a media presentation device to establish a connection in the first frequency band and transmit the media data based on the established connection. Thereby, transmission performance of the media data may be ensured, and power consumption may be reduced.

17 Claims, 14 Drawing Sheets

---

Receive a play instruction, where the play instruction is used to instruct a media presentation device to request to acquire first media content from a media source device — 101a When it is determined that the first media content belongs to a first type of media data, and that at least one of the media source device and the media presentation device uses a second frequency band to access a wireless local area network, or when it is determined that the first media content belongs to a first type of media data, and that the media source device and the media presentation device use a second frequency band to directly establish a connection, control the media source device and the media presentation device to establish a connection in a first frequency band and transmit the first media content based on the connection, where the second frequency band is different from the first frequency band — 102a

(51) Int. Cl.
*H04W 40/18* (2009.01)
*H04L 12/28* (2006.01)
*H04N 21/2385* (2011.01)
*H04N 21/4363* (2011.01)
*H04W 72/04* (2009.01)
*H04W 76/10* (2018.01)
*H04W 84/12* (2009.01)

(52) U.S. Cl.
CPC ... *H04N 21/2385* (2013.01); *H04N 21/43637* (2013.01); *H04W 40/18* (2013.01); *H04W 72/0453* (2013.01); *H04W 76/10* (2018.02); *H04L 2012/2841* (2013.01); *H04L 2012/2849* (2013.01); *H04W 84/12* (2013.01); *Y02D 70/00* (2018.01); *Y02D 70/142* (2018.01); *Y02D 70/30* (2018.01)

(56) References Cited

U.S. PATENT DOCUMENTS

| | | | |
|---|---|---|---|
| 9,317,241 B2* | 4/2016 | Tranchina | G06F 3/1423 |
| 2007/0099669 A1 | 5/2007 | Sadri et al. | |
| 2008/0176561 A1 | 7/2008 | Shao et al. | |
| 2008/0240146 A1 | 10/2008 | Singh et al. | |
| 2008/0313351 A1 | 12/2008 | Mobasser | |
| 2009/0168650 A1* | 7/2009 | Kesselman | H04W 88/06 370/235 |
| 2011/0170011 A1 | 7/2011 | Choi et al. | |
| 2013/0028576 A1 | 1/2013 | Ushimaru et al. | |
| 2013/0053080 A1* | 2/2013 | Gebert | H04W 76/10 455/509 |
| 2013/0219048 A1 | 8/2013 | Arvidsson et al. | |
| 2013/0222515 A1 | 8/2013 | Abuan et al. | |
| 2014/0351867 A1* | 11/2014 | Hommel | H04N 21/2146 725/75 |

FOREIGN PATENT DOCUMENTS

| | | |
|---|---|---|
| CN | 102137254 A | 7/2011 |
| CN | 102714753 A | 10/2012 |
| CN | 102843579 B | 11/2014 |
| WO | 2007126279 A1 | 11/2007 |

OTHER PUBLICATIONS

Partial English Translation and Abstract of Chinese Patent Application No. CN102137254, Oct. 27, 2016, 5 pages.
Partial English Translation and Abstract of Chinese Patent Application No. CN102843579, Oct. 27, 2016, 15 pages.
"Series H: Audiovisual and Multimedia Systems Infrastructure of audiovisual services—Coding of moving video, Advanced video coding for generic audiovisual services," ITU-T, H.264, Apr. 2013, 732 pages.
Foreign Communication From a Counterpart Application, Chinese Application No. 201380003144.6, Chinese Office Action dated Dec. 3, 2015, 6 pages.
Foreign Communication From a Counterpart Application, European Application No. 13894267.7, Extended European Search Report dated Jul. 5, 2016, 7 pages.
Foreign Communication From a Counterpart Application, PCT Application No. PCT/CN2013/084729, English Translation of International Search Report dated Jul. 9, 2014, 2 pages.
Foreign Communication From a Counterpart Application, PCT Application No. PCT/CN2013/084729, English Translation of Written Opinion dated Jul. 9, 2014, 6 pages.

* cited by examiner

MEDIA DATA TRANSMISSION METHOD AND DEVICE

TECHNICAL FIELD

Embodiments of the present disclosure relate to communications technologies, and in particular, to a media data transmission method and a device.

BACKGROUND

Development of digital homes and wide digitalization of consumer electronic products bring more and more digital entertainment devices and household appliances in home networks. Currently, various consumer electronic products begin to support wireless local area network (WLAN) communication capabilities, for example, support 802.11 series of standards established by the Institute of Electrical and Electronics Engineers (IEEE), including 802.11a, 802.11b, 802.11g, 802.11n, and standards such as 802.11ac and 802.11ad that are entering a market.

In the foregoing 802.11 standards, except 802.11ad that uses a 60 gigahertz (GHz) frequency band, all standards use a 2.4 GHz and/or 5 GHz frequency band. Currently, a majority of consumer electronic products use the 2.4 GHz and/or 5 GHz frequency band to access a WLAN, but the 2.4 GHz and/or 5 GHz frequency band is not suitable for transmitting high definition media data that is prevalent currently or ultra high definition media data that may be prevalent in the future. In theory, bandwidth of the 60 GHz frequency band or a similar high frequency band may reach 7 gigabits per second (Gbit/s), and such frequency bands are applicable to transmission of high definition audio and video data, but their penetration is poor. Therefore, if the consumer electronic products use the 60 GHz frequency band to access the WLAN, power consumption of the consumer electronic products is large.

SUMMARY

Embodiments of the present disclosure provide a media data transmission method and a device, which are used to ensure transmission performance of media data and reduce power consumption.

According to a first aspect, a media data transmission method is provided and includes receiving a play instruction, where the play instruction is used to instruct a media presentation device to request to acquire first media content from a media source device; and when it is determined that the first media content belongs to a first type of media data, and that at least one of the media source device and the media presentation device uses a second frequency band to access a wireless local area network, or when it is determined that the first media content belongs to a first type of media data, and that the media source device and the media presentation device use a second frequency band to directly establish a connection, controlling the media source device and the media presentation device to establish a connection in a first frequency band and transmit the first media content based on the connection, where the second frequency band is different from the first frequency band.

With reference to the first aspect, in a first possible implementation manner of the first aspect, the receiving a play instruction includes acquiring a media information list from the media source device, where the media information list includes at least an identifier of the first media content; displaying the media information list; and receiving the play instruction that is sent when a user selects the first media content according to the media information list.

With reference to the first aspect or the first possible implementation manner of the first aspect, in a second possible implementation manner of the first aspect, the determining that the first media content belongs to a first type of media data includes comparing a resolution of the first media content with a resolution threshold corresponding to the first type of media data; and if the resolution of the first media content is greater than or equal to the resolution threshold, determining that the first media content belongs to the first type of media data.

With reference to the first aspect or the first possible implementation manner of the first aspect or the second possible implementation manner of the first aspect, in a third possible implementation manner of the first aspect, before the controlling the media source device and the media presentation device to establish a connection in a first frequency band, the method further includes acquiring capability information of the media source device and/or capability information of the media presentation device, and determining, according to the capability information of the media source device and/or the capability information of the media presentation device, that the media source device and the media presentation device may establish the connection in the first frequency band.

With reference to the third possible implementation manner of the first aspect, in a fourth possible implementation manner of the first aspect, one of the media source device and the media presentation device uses the second frequency band to access the wireless local area network, and the other one is connected to a router in the wireless local area network in a wired manner; and the acquiring capability information of the media source device and/or capability information of the media presentation device, and determining, according to the capability information of the media source device and/or the capability information of the media presentation device, that the media source device and the media presentation device may establish the connection in the first frequency band, include acquiring the capability information of the device using the second frequency band to access the wireless local area network, in the media source device and the media presentation device, and capability information of the router, and determining, according to the capability information of the device using the second frequency band to access the wireless local area network, in the media source device and the media presentation device, and the capability information of the router, that the device using the second frequency band to access the wireless local area network, in the media source device and the media presentation device, and the router may establish a connection in the first frequency band.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the controlling the media source device and the media presentation device to establish a connection in a first frequency band and transmit the first media content based on the connection includes, when it is determined that the first media content belongs to the first type of media data, and that both the media source device and the media presentation device use the second frequency band to access the wireless local area network, or when it is determined that the first media content belongs to the first type of media data, and that the media source device and the media presentation device use the second frequency band to directly establish the connection, generating a parameter configuration used by the media source device and the media presentation device for transmitting the first media content in the first frequency band, and sending the parameter configuration to the media source device and the media presentation device, so that the media source device and the media presentation device establish the connection in the first frequency band and transmit the first media content based on the connection; or when it is determined that the first media content belongs to the first type of media data, and that one of the media source device and the media presentation device uses the second frequency band to access the wireless local area network, and that the other one is connected to the router in the wireless local area network in the wired manner, generating a parameter configuration used by the media source device and the media presentation device for transmitting the first media content in the first frequency band, and sending the parameter configuration to the device using the second frequency band to access the wireless local area network, in the media source device and the media presentation device, and the router, so that the media source device and the media presentation device establish the connection in the first frequency band by using the router and transmit the first media content based on the connection.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the first type of media data is high definition media data, full high definition media data, or ultra high definition media data.

With reference to the sixth possible implementation manner of the first aspect, in a seventh possible implementation manner of the first aspect, frequencies in the first frequency band are higher than frequencies in the second frequency band.

With reference to the seventh possible implementation manner of the first aspect, in an eighth possible implementation manner of the first aspect, the second frequency band is 2.4 GHz, and the first frequency band is 5 GHz, 45 GHz, or 60 GHz; or the second frequency band is 5 GHz, and the first frequency band is 45 GHz or 60 GHz.

With reference to the fifth possible implementation manner of the first aspect or the sixth possible implementation manner of the first aspect or the seventh possible implementation manner of the first aspect or the eighth possible implementation manner of the first aspect, in a ninth possible implementation manner of the first aspect, when the parameter configuration is sent to the media source device, the parameter configuration includes a frequency band identifier of the first frequency band and an identifier of the media presentation device; or when the parameter configuration is sent to the media presentation device, the parameter configuration includes a frequency band identifier of the first frequency band and an identifier of the media source device.

According to a second aspect, a media data transmission method is provided and includes receiving, by a media source device, a control instruction from a control device, where the control instruction is sent when the control device determines that first media content that needs to be sent by the media source device to a media presentation device belongs to a first type of media data, and that at least one of the media source device and the media presentation device uses a second frequency band to access a wireless local area network, or determines that first media content to be sent by the media source device to a media presentation device belongs to a first type of media data, and that the media source device and the media presentation device use a second frequency band to directly establish a connection; establishing, by the media source device, a connection in a first frequency band with the media presentation device according to the control instruction, where the second frequency band is different from the first frequency band; and transmitting, by the media source device by using the connection established in the first frequency band, the first media content to the media presentation device.

With reference to the second aspect, in a first possible implementation manner of the second aspect, the control instruction is a parameter configuration used by the media source device and the media presentation device for transmitting the first media content in the first frequency band.

With reference to the second aspect or the first possible implementation manner of the second aspect, in a second possible implementation manner of the second aspect, before the receiving, by a media source device, a control instruction from a control device, the method further includes providing, by the media source device, capability information of the media source device for the control device.

With reference to the second aspect or the first possible implementation manner of the second aspect or the second possible implementation manner of the second aspect, in a third possible implementation manner of the second aspect, before the establishing, by the media source device, a connection in a first frequency band with the media presentation device according to the control instruction, the method includes transmitting, by the media source device by using the connection established in the second frequency band with the media presentation device, some data of the first media content to the media presentation device; and the transmitting, by the media source device by using the connection established in the first frequency band, the first media content to the media presentation device, includes transmitting, by the media source device by using the connection established in the first frequency band, other data of the first media content to the media presentation device, where the other data has not been transmitted by using the connection established in the second frequency band.

According to a third aspect, a media data transmission method is provided and includes receiving, by a media presentation device, a control instruction from a control device, where the control instruction is sent when the control device determines that first media content that needs to be sent by a media source device to the media presentation device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection; establishing, by the media presentation device, a connection in a first frequency band with the media source device according to the control instruction, where the second frequency band is different from the first frequency band; and receiving, by the media presentation device by using the connection established in the first frequency band, the first media content transmitted by the media source device.

With reference to the third aspect, in a first possible implementation manner of the third aspect, the control instruction is a parameter configuration used by the media presentation device and the media source device for transmitting the first media content in the first frequency band.

With reference to the third aspect or the first possible implementation manner of the third aspect, in a second possible implementation manner of the third aspect, before the receiving, by a media presentation device, a control instruction from a control device, the method includes providing, by the media presentation device, capability information of the media presentation device for the control device.

With reference to the third aspect or the first possible implementation manner of the third aspect or the second possible implementation manner of the third aspect, in a third possible implementation manner of the third aspect, before the establishing, by the media presentation device, a connection in a first frequency band with the media source device according to the control command, the method includes receiving, by the media presentation device by using the connection established in the second frequency band with the media source device, some data of the first media content transmitted by the media source device; and the receiving, by the media presentation device by using the connection established in the first frequency band, the first media content transmitted by the media source device, includes receiving, by the media presentation device by using the connection established in the first frequency band, other data of the first media content transmitted by the media source device, where the other data has not been transmitted by using the connection established in the second frequency band.

According to a fourth aspect, a media data transmission method is provided and includes, when a media source device determines that media content that needs to be transmitted to a media presentation device belongs to a first type of media data, and that at least one of the media source device and the media presentation device uses a second frequency band to access a wireless local area network, or when a media source device determines that media content that needs to be transmitted to a media presentation device belongs to a first type of media data, and that the media source device and the media presentation device use a second frequency band to directly establish a connection, establishing, by the media source device, a connection in a first frequency band with the media presentation device, where the second frequency band is different from the first frequency band; and transmitting, by the media source device by using the connection established in the first frequency band, the media content to the media presentation device.

With reference to the fourth aspect, in a first possible implementation manner of the fourth aspect, before the establishing, by the media source device, a connection in a first frequency band with the media presentation device, the method further includes acquiring, by the media source device, capability information of the media presentation device, and determining, according to capability information of the media source device and/or the capability information of the media presentation device, that the media source device and the media presentation device may establish the connection in the first frequency band.

With reference to the fourth aspect or the first possible implementation manner of the fourth aspect, in a second possible implementation manner of the fourth aspect, the establishing, by the media source device, a connection in a first frequency band with the media presentation device, includes generating, by the media source device, a parameter configuration used by the media source device and the media presentation device for transmitting the media content in the first frequency band, and sending the parameter configuration to the media presentation device, to establish the connection in the first frequency band with the media presentation device.

With reference to the fourth aspect or the first possible implementation manner of the fourth aspect or the second possible implementation manner of the fourth aspect, in a third possible implementation manner of the fourth aspect, before the establishing, by the media source device, a connection in a first frequency band with the media presentation device, the method includes transmitting, by the media source device by using the connection established in the second frequency band between the media source device and the media presentation device, some data of the media content to the media presentation device; and the transmitting, by the media source device by using the connection established in the first frequency band, the media content to the media presentation device, includes transmitting, by the media source device by using the connection established in the first frequency band, other data of the media content to the media presentation device, where the other data has not been transmitted by using the connection established in the second frequency band.

With reference to the first possible implementation manner of the fourth aspect or the second possible implementation manner of the fourth aspect or the third possible implementation manner of the fourth aspect, in a fourth possible implementation manner of the fourth aspect, the acquiring, by the media source device, capability information of the media presentation device, includes acquiring, by the media source device, the capability information of the media presentation device by using the Universal Plug and Play (UpnP) protocol; or acquiring, by the media source device, the capability information of the media presentation device by using Wireless Fidelity (Wi-Fi) Media Access Control (MAC) layer signaling; or acquiring, by the media source device, the capability information of the media presentation device by using a Real-Time Streaming Protocol (RTSP) message.

With reference to the fourth aspect or the first possible implementation manner of the fourth aspect or the second possible implementation manner of the fourth aspect or the third possible implementation manner of the fourth aspect or the fourth possible implementation manner of the fourth aspect, in a fifth possible implementation manner of the fourth aspect, the first type of media data is high definition media data, full high definition media data, or ultra high definition media data.

With reference to the fifth possible implementation manner of the fourth aspect, in a sixth possible implementation manner of the fourth aspect, frequencies in the first frequency band are higher than frequencies in the second frequency band.

With reference to the sixth possible implementation manner of the fourth aspect, in a seventh possible implementation manner of the fourth aspect, the second frequency band is 2.4 GHz, and the first frequency band is 5 GHz, 45 GHz, or 60 GHz; or the second frequency band is 5 GHz, and the first frequency band is 45 GHz or 60 GHz.

With reference to the second possible implementation manner of the fourth aspect or the third possible implementation manner of the fourth aspect or the fourth possible implementation manner of the fourth aspect or the fifth possible implementation manner of the fourth aspect or the sixth possible implementation manner of the fourth aspect or the seventh possible implementation manner of the fourth aspect, in an eighth possible implementation manner of the fourth aspect, the parameter configuration includes a frequency band identifier of the first frequency band and an identifier of the media source device.

According to a fifth aspect, a control device is provided and includes a receiving module configured to receive a play instruction, where the play instruction is used to instruct a media presentation device to request to acquire first media content from a media source device; and a control module configured to, when it is determined that the first media content belongs to a first type of media data, and that at least one of the media source device and the media presentation device uses a second frequency band to access a wireless local area network, or when it is determined that the first media content belongs to a first type of media data, and that the media source device and the media presentation device use a second frequency band to directly establish a connection, control the media source device and the media presentation device to establish a connection in a first frequency band and transmit the first media content based on the connection, where the second frequency band is different from the first frequency band.

With reference to the fifth aspect, in a first possible implementation manner of the fifth aspect, the control device further includes a first acquiring module configured to acquire a media information list from the media source device, where the media information list includes at least an identifier of the first media content; and a displaying module configured to display the media information list; where the receiving module is configured to receive the play instruction that is sent when a user selects the first media content according to the media information list.

With reference to the fifth aspect or the first possible implementation manner of the fifth aspect, in a second possible implementation manner of the fifth aspect, the control device further includes a first determining module configured to compare a resolution of the first media content with a resolution threshold corresponding to the first type of media data; and if the resolution of the first media content is greater than or equal to the resolution threshold, determine that the first media content belongs to the first type of media data, and determine that at least one of the media source device and the media presentation device uses the second frequency band to access the wireless local area network.

With reference to the fifth aspect or the first possible implementation manner of the fifth aspect or the second possible implementation manner of the fifth aspect, in a third possible implementation manner of the fifth aspect, the control device further includes a second acquiring module configured to acquire capability information of the media source device and/or capability information of the media presentation device; and a second determining module configured to determine, according to the capability information of the media source device and/or the capability information of the media presentation device, that the media source device and the media presentation device may establish the connection in the first frequency band; where the control module is configured to, when it is determined that the first media content belongs to the first type of media data, and that at least one of the media source device and the media presentation device uses the second frequency band to access the wireless local area network, and the second determining module determines that the media source device and the media presentation device may establish the connection in the first frequency band, or when it is determined that the first media content belongs to the first type of media data, and that the media source device and the media presentation device use the second frequency band to directly establish the connection, and the second determining module determines that the media source device and the media presentation device may establish the connection in the first frequency band, control the media source device and the media presentation device to establish the connection in the first frequency band and transmit the first media content based on the connection.

With reference to the third possible implementation manner of the fifth aspect, in a fourth possible implementation manner of the fifth aspect, the second acquiring module is configured to, when one of the media source device and the media presentation device uses the second frequency band to access the wireless local area network, and the other one is connected to a router in the wireless local area network in a wired manner, acquire the capability information of the device using the second frequency band to access the wireless local area network, in the media source device and the media presentation device, and capability information of the router; and the second determining module is configured to determine, according to the capability information of the device using the second frequency band to access the wireless local area network, in the media source device and the media presentation device, and the capability information of the router, that the device using the second frequency band to access the wireless local area network, in the media source device and the media presentation device, and the router may establish a connection in the first frequency band.

With reference to the fifth aspect or the first possible implementation manner of the fifth aspect or the second possible implementation manner of the fifth aspect or the third possible implementation manner of the fifth aspect or the fourth possible implementation manner of the fifth aspect, in a fifth possible implementation manner of the fifth aspect, the control module is configured to, when it is determined that the first media content belongs to the first type of media data, and that both the media source device and the media presentation device use the second frequency band to access the wireless local area network, or when it is determined that the first media content belongs to the first type of media data, and that the media source device and the media presentation device use the second frequency band to directly establish the connection, generate a parameter configuration used by the media source device and the media presentation device for transmitting the first media content in the first frequency band, and send the parameter configuration to the media source device and the media presentation device, so that the media source device and the media presentation device establish the connection in the first frequency band and transmit the first media content based on the connection; or the control module is configured to, when it is determined that the first media content belongs to the first type of media data, and that one of the media source device and the media presentation device uses the second frequency band to access the wireless local area network, and that the other one is connected to the router in the wireless local area network in the wired manner, generate a parameter configuration used by the media source device and the media presentation device for transmitting the first media content in the first frequency band, and send the parameter configuration to the device using the second frequency band to access the wireless local area network, in the media source device and the media presentation device, and the router, so that the media source device and the media presentation device establish the connection in the first frequency band by using the router and transmit the first media content based on the connection.

With reference to the fifth aspect or the first possible implementation manner of the fifth aspect or the second possible implementation manner of the fifth aspect or the third possible implementation manner of the fifth aspect or the fourth possible implementation manner of the fifth aspect or the fifth possible implementation manner of the fifth aspect, in a sixth possible implementation manner of the fifth aspect, the first type of media data is high definition media data, full high definition media data, or ultra high definition media data.

With reference to the sixth possible implementation manner of the fifth aspect, in a seventh possible implementation manner of the fifth aspect, frequencies in the first frequency band are higher than frequencies in the second frequency band.

With reference to the seventh possible implementation manner of the fifth aspect, in an eighth possible implementation manner of the fifth aspect, the second frequency band is 2.4 GHz, and the first frequency band is 5 GHz, 45 GHz, or 60 GHz; or the second frequency band is 5 GHz, and the first frequency band is 45 GHz or 60 GHz.

With reference to the fifth possible implementation manner of the fifth aspect or the sixth possible implementation manner of the fifth aspect or the seventh possible implementation manner of the fifth aspect or the eighth possible implementation manner of the fifth aspect, in a ninth possible implementation manner of the fifth aspect, when the parameter configuration is sent to the media source device, the parameter configuration includes a frequency band identifier of the first frequency band and an identifier of the media presentation device; or when the parameter configuration is sent to the media presentation device, the parameter configuration includes a frequency band identifier of the first frequency band and an identifier of the media source device.

According to a sixth aspect, a media source device is provided and includes a receiving module configured to receive a control instruction from a control device, where the control instruction is sent when the control device determines that first media content that needs to be sent by the media source device to a media presentation device belongs to a first type of media data, and that at least one of the media source device and the media presentation device uses a second frequency band to access a wireless local area network, or determines that first media content to be sent by the media source device to a media presentation device belongs to a first type of media data, and that the media source device and the media presentation device use a second frequency band to directly establish a connection; an establishing module configured to establish a connection in a first frequency band with the media presentation device according to the control instruction, where the second frequency band is different from the first frequency band; and a transmitting module configured to transmit the first media content to the media presentation device by using the connection established in the first frequency band.

With reference to the sixth aspect, in a first possible implementation manner of the sixth aspect, the control instruction is a parameter configuration used by the media source device and the media presentation device for transmitting the first media content in the first frequency band.

With reference to the sixth aspect or the first possible implementation manner of the sixth aspect, in a second possible implementation manner of the sixth aspect, the media source device further includes a sending module configured to provide capability information of the media source device for the control device before the establishing module establishes the connection in the first frequency band with the media presentation device.

With reference to the sixth aspect or the first possible implementation manner of the sixth aspect or the second possible implementation manner of the sixth aspect, in a third possible implementation manner of the sixth aspect, the transmitting module is configured to, before the media source device establishes the connection in the first frequency band with the media presentation device, transmit some data of the first media content to the media presentation device by using the connection established in the second frequency band with the media presentation device, and after the media source device establishes the connection in the first frequency band with the media presentation device, transmit other data of the first media content to the media presentation device by using the connection established in the first frequency band, where the other data has not been transmitted by using the connection established in the second frequency band.

According to a seventh aspect, a media presentation device is provided and includes a receiving module configured to receive a control instruction from a control device, where the control instruction is sent when the control device determines that first media content that needs to be sent by a media source device to the media presentation device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection; and an establishing module configured to establish a connection in a first frequency band with the media source device according to the control instruction, where the second frequency band is different from the first frequency band; where the receiving module is further configured to receive, by using the connection established in the first frequency band, the first media content transmitted by the media source device.

With reference to the seventh aspect, in a first possible implementation manner of the seventh aspect, the control instruction is a parameter configuration used by the media presentation device and the media source device for transmitting the first media content in the first frequency band.

With reference to the seventh aspect or the first possible implementation manner of the seventh aspect, in a second possible implementation manner of the seventh aspect, the media presentation device further includes a sending module configured to provide capability information of the media presentation device for the control device before the establishing module establishes the connection in the first frequency band with the media source device.

With reference to the seventh aspect or the first possible implementation manner of the seventh aspect or the second possible implementation manner of the seventh aspect, in a third possible implementation manner of the seventh aspect, the receiving module is configured to, before the media presentation device establishes the connection in the first frequency band with the media source device, receive, by using the connection established in the second frequency band with the media source device, some data of the first media content transmitted by the media source device, and after the media presentation device establishes the connection in the first frequency band with the media source device, receive, by using the connection established in the first frequency band, other data of the first media content transmitted by the media source device, where the other data has not been transmitted by using the connection established in the second frequency band.

According to an eighth aspect, a media source device is provided and includes an establishing module configured to, when it is determined that media content that needs to be transmitted to a media presentation device belongs to a first type of media data, and that at least one of the media source device and the media presentation device uses a second frequency band to access a wireless local area network, or when it is determined that media content that needs to be transmitted to a media presentation device belongs to a first type of media data, and that the media source device and the media presentation device use a second frequency band to directly establish a connection, establish a connection in a first frequency band with the media presentation device, where the second frequency band is different from the first frequency band; and a transmitting module configured to transmit the media content to the media presentation device by using the connection established in the first frequency band.

With reference to the eighth aspect, in a first possible implementation manner of the eighth aspect, the media source device further includes an acquiring module configured to acquire capability information of the media presentation device; and a determining module configured to determine, according to capability information of the media source device and/or the capability information of the media presentation device, that the media source device and the media presentation device may establish the connection in the first frequency band; where the establishing module is configured to, when it is determined that the media content that needs to be transmitted to the media presentation device belongs to the first type of media data, and that at least one of the media source device and the media presentation device uses the second frequency band to access the wireless local area network, and the determining module determines that the media source device and the media presentation device may establish the connection in the first frequency band, or when it is determined that the media content that needs to be transmitted to the media presentation device belongs to the first type of media data, and that the media source device and the media presentation device use the second frequency band to directly establish the connection, and the determining module determines that the media source device and the media presentation device may establish the connection in the first frequency band, establish the connection in the first frequency band with the media presentation device.

With reference to the eighth aspect or the first possible implementation manner of the eighth aspect, in a second possible implementation manner of the eighth aspect, the establishing module is configured to, when it is determined that the media content that needs to be transmitted to the media presentation device belongs to the first type of media data, and that at least one of the media source device and the media presentation device uses the second frequency band to access the wireless local area network, or when it is determined that the media content that needs to be transmitted to the media presentation device belongs to the first type of media data, and that the media source device and the media presentation device use the second frequency band to directly establish the connection, generate a parameter configuration used by the media source device and the media presentation device for transmitting the media content in the first frequency band, and send the parameter configuration to the media presentation device, to establish the connection in the first frequency band with the media presentation device.

With reference to the eighth aspect or the first possible implementation manner of the eighth aspect or the second possible implementation manner of the eighth aspect, in a third possible implementation manner of the eighth aspect, the transmitting module is configured to, before the media source device establishes the connection in the first frequency band with the media presentation device, transmit some data of the media content to the media presentation device by using the connection established in the second frequency band between the media source device and the media presentation device, and after the media source device establishes the connection in the first frequency band with the media presentation device, transmit other data of the media content to the media presentation device by using the connection established in the first frequency band, where the other data has not been transmitted by using the connection established in the second frequency band.

With reference to the first possible implementation manner of the eighth aspect or the second possible implementation manner of the eighth aspect or the third possible implementation manner of the eighth aspect, in a fourth possible implementation manner of the eighth aspect, the acquiring module is configured to acquire the capability information of the media presentation device by using the UPnP protocol; or the acquiring module is configured to acquire the capability information of the media presentation device by using Wi-Fi MAC layer signaling; or the acquiring module is configured to acquire the capability information of the media presentation device by using a RTSP message.

With reference to the eighth aspect or the first possible implementation manner of the eighth aspect or the second possible implementation manner of the eighth aspect or the third possible implementation manner of the eighth aspect or the fourth possible implementation manner of the eighth aspect, in a fifth possible implementation manner of the eighth aspect, the first type of media data is high definition media data, full high definition media data, or ultra high definition media data.

With reference to the fifth possible implementation manner of the eighth aspect, in a sixth possible implementation manner of the eighth aspect, frequencies in the first frequency band are higher than frequencies in the second frequency band.

With reference to the sixth possible implementation manner of the eighth aspect, in a seventh possible implementation manner of the eighth aspect, the second frequency band is 2.4 GHz, and the first frequency band is 5 GHz, 45 GHz, or 60 GHz; or the second frequency band is 5 GHz, and the first frequency band is 45 GHz or 60 GHz.

With reference to the second possible implementation manner of the eighth aspect or the third possible implementation manner of the eighth aspect or the fourth possible implementation manner of the eighth aspect or the fifth possible implementation manner of the eighth aspect or the sixth possible implementation manner of the eighth aspect, in a seventh possible implementation manner of the eighth aspect, the parameter configuration includes a frequency band identifier of the first frequency band and an identifier of the media source device.

According to a ninth aspect, a control device is provided and includes a receiver configured to receive a play instruction, where the play instruction is used to instruct a media presentation device to request to acquire first media content from a media source device; and a processor configured to, when it is determined that the first media content belongs to a first type of media data, and that at least one of the media source device and the media presentation device uses a second frequency band to access a wireless local area network, or when it is determined that the first media content belongs to a first type of media data, and that the media source device and the media presentation device use a second frequency band to directly establish a connection, control the media source device and the media presentation device to establish a connection in a first frequency band and transmit the first media content based on the connection, where the second frequency band is different from the first frequency band.

According to a tenth aspect, a media source device is provided and includes a receiver configured to receive a control instruction from a control device, where the control instruction is sent when the control device determines that first media content that needs to be sent by the media source device to a media presentation device belongs to a first type of media data, and that at least one of the media source device and the media presentation device uses a second frequency band to access a wireless local area network, or determines that first media content to be sent by the media source device to a media presentation device belongs to a first type of media data, and that the media source device and the media presentation device use a second frequency band to directly establish a connection; and a processor configured to establish a connection in a first frequency band with the media presentation device according to the control instruction, and transmit the first media content to the media presentation device by using the connection established in the first frequency band, where the second frequency band is different from the first frequency band.

According to an eleventh aspect, a media presentation device is provided and includes a receiver configured to receive a control instruction from a control device, where the control instruction is sent when the control device determines that first media content that needs to be sent by a media source device to the media presentation device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection; and a processor configured to establish a connection in a first frequency band with the media source device according to the control instruction, where the second frequency band is different from the first frequency band; where the receiver is further configured to receive, by using the connection established in the first frequency band, the first media content transmitted by the media source device.

According to a twelfth aspect, a media source device is provided and includes a processor configured to, when it is determined that media content that needs to be transmitted to a media presentation device belongs to a first type of media data, and that at least one of the media source device and the media presentation device uses a second frequency band to access a wireless local area network, or when it is determined that media content that needs to be transmitted to a media presentation device belongs to a first type of media data, and that the media source device and the media presentation device use a second frequency band to directly establish a connection, establish a connection in a first frequency band with the media presentation device, where the second frequency band is different from the first frequency band; and a transmitter configured to transmit the media content to the media presentation device by using the connection established in the first frequency band.

According to the media data transmission method and the device provided by the embodiments of the present disclosure, after a play instruction for instructing a media presentation device to request to acquire media content from a media source device is received, when it is determined that media content that a user requests to play belongs to a first type of media data, and that at least one of the media source device and the media presentation device uses a second frequency band to access a wireless local area network, or when it is determined that media content that a user requests to play belongs to a first type of media data, and that the media source device and the media presentation device use a second frequency band to directly establish a connection, the media source device and the media presentation device are controlled to establish a connection in a first frequency band and complete transmission of the media content based on the established connection. Thereby, the first frequency band may not be always used during large power consumption but is used only when media content needs to be transmitted, which is advantageous to saving power of related devices and may further improve transmission quality and playback quality of the first type of media data.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1A:
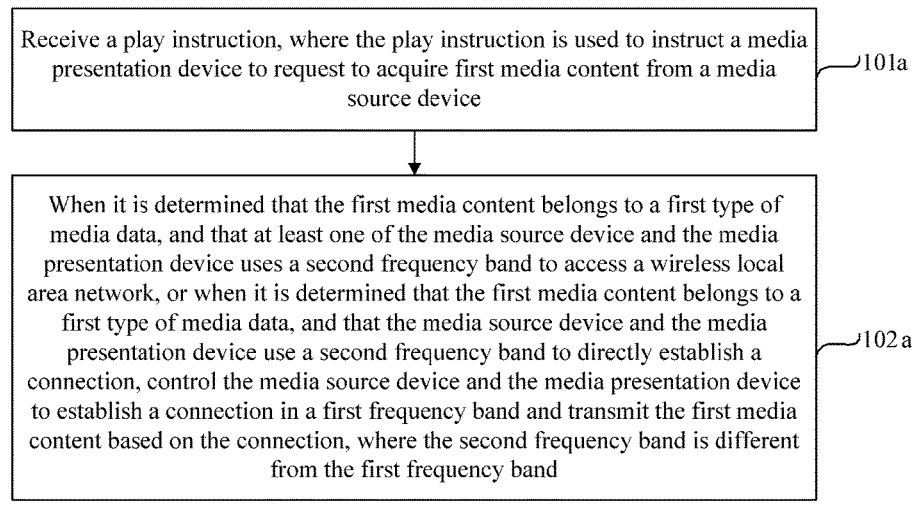
FIG. 1A is a flowchart of a media data transmission method according to an embodiment of the present disclosure.

FIG. 1A is a flowchart of a media data transmission method according to an embodiment of the present disclosure. As shown in FIG. 1A, the method includes the following steps.

101a. Receive a play instruction, where the play instruction is used to instruct a media presentation device to request to acquire first media content from a media source device.

102a. When it is determined that the first media content belongs to a first type of media data, and that at least one of the media source device and the media presentation device uses a second frequency band to access a wireless local area network, or when it is determined that the first media content belongs to a first type of media data, and that the media source device and the media presentation device use a second frequency band to directly establish a connection, control the media source device and the media presentation device to establish a connection in a first frequency band and transmit the first media content based on the connection, where the second frequency band is different from the first frequency band.

In an optional implementation manner, the controlling the media source device and the media presentation device to establish a connection in a first frequency band and transmit the first media content based on the connection may include, when it is determined that the first media content belongs to the first type of media data, and that both the media source device and the media presentation device use the second frequency band to access the wireless local area network, or when it is determined that the first media content belongs to the first type of media data, and that the media source device and the media presentation device use the second frequency band to directly establish the connection, generating a parameter configuration used by the media source device and the media presentation device for transmitting the first media content in the first frequency band, and sending the parameter configuration to the media source device and the media presentation device, so that the media source device and the media presentation device establish the connection in the first frequency band and transmit the first media content based on the connection; or when it is determined that the first media content belongs to the first type of media data, and that one of the media source device and the media presentation device uses the second frequency band to access the wireless local area network, and that the other one is connected to a router in the wireless local area network in a wired manner, generating a parameter configuration used by the media source device and the media presentation device for transmitting the first media content in the first frequency band, and sending the parameter configuration to the device using the second frequency band to access the wireless local area network, in the media source device and the media presentation device, and the router, so that the media source device and the media presentation device establish the connection in the first frequency band by using the router and transmit the first media content based on the connection.

Figure 1B:
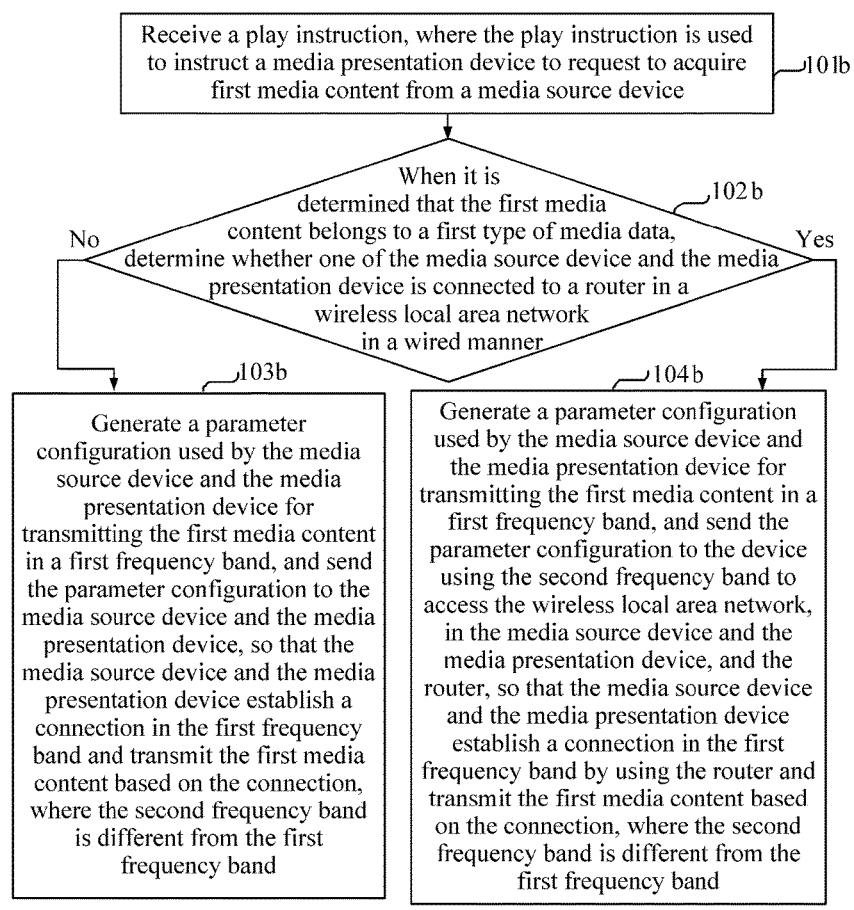
FIG. 1B is a flowchart of another media data transmission method according to an embodiment of the present disclosure.

Based on the foregoing description, a flowchart of another media data transmission method provided by an embodiment of the present disclosure is shown in FIG. 1B and includes the following steps.

101b. Receive a play instruction, where the play instruction is used to instruct a media presentation device to request to acquire first media content from a media source device.

102b. When it is determined that the first media content belongs to a first type of media data, determine whether one of the media source device and the media presentation device is connected to a router in a wireless local area network in a wired manner; and if a determining result is no, that is, both the media source device and the media presentation device use a second frequency band to access the wireless local area network, or the media source device and the media presentation device use a second frequency band to directly establish a connection, execute step 103b; or if a determining result is yes, that is, one of the media source device and the media presentation device uses a second frequency band to access the wireless local area network, and the other one is connected to the router in the wireless local area network in the wired manner, execute step 104b.

103b. Generate a parameter configuration used by the media source device and the media presentation device for transmitting the first media content in a first frequency band, and send the parameter configuration to the media source device and the media presentation device, so that the media source device and the media presentation device establish a connection in the first frequency band and transmit the first media content based on the connection, where the second frequency band is different from the first frequency band.

104b. Generate a parameter configuration used by the media source device and the media presentation device for transmitting the first media content in a first frequency band, and send the parameter configuration to the device using the second frequency band to access the wireless local area network, in the media source device and the media presentation device, and the router, so that the media source device and the media presentation device establish a connection in the first frequency band by using the router and transmit the first media content based on the connection, where the second frequency band is different from the first frequency band.

In the embodiment of the present disclosure, the media source device may be any device that is capable of providing media content, and the media presentation device may be any device that is capable of playing media content, for example, a television (TV) or a personal computer (PC). In this embodiment, the media source device under control of a control device transmits media content to the media presentation device, and then the media presentation device plays the media content. The control device may be any device that has a control function, for example, a mobile phone of a user.

It should be noted herein that, the control device may be implemented as an independent device, or may be integrated with the media source device or the media presentation device for implementation. The embodiment of the present disclosure is described by using an example in which the control device is an independent device, but is not limited thereto.

In an actual application, when the user wishes to play a piece of media content by using a media presentation device, the user may send a play instruction to the control device, where the play instruction is used to instruct the media presentation device to request to acquire first media content from the media source device. In this embodiment, for ease of description, the media content that the user requests to play is recorded as the first media content, and the first media content is the media content requested from the media source device. Generally, the user may perform interaction with the control device by using a manner such as a touch, a voice, a gesture, or a click with a conventional mouse, and thereby send the play instruction to the control device. For example, the user may browse a media information list in the media source device by using the control device, determine the first media content that the user requests to play in the media information list, and control playing of the first media content in the media presentation device, for example, a TV. The control device receives the play instruction sent by the user, and knows, according to the play instruction, the specific media content that the user requests from the media source device and the media presentation device that the user wishes to use.

In an actual application, in most cases, the user sends a play instruction directly, but the present disclosure is not limited to this manner. For example, the control device may sequentially control, according to a preset playlist, the media source device and the media presentation device to play each piece of media content, and in this case, the control instruction received by the control device is not directly sent by the user, but is automatically triggered by the playlist.

Afterward, the control device may determine whether the first media content belongs to the first type of media data. In this embodiment, media data may be classified into at least two types. The first type of media data mainly refers to media data that is suitable for transmission in the first frequency band, for example, may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p). Definitions of other types of media data than the first type of media data and frequency bands in which the other types of media data are suitable for transmission, are not limited in the embodiment of the present disclosure.

In an optional implementation manner, another implementation manner of step 101 includes acquiring, by the control device, a media information list from the media source device, displaying the media information list for the user to select the first media content, and then receiving the play instruction that is sent when the user selects the first media content according to the media information list. The media information list includes at least an identifier of the first media content. The identifier of the first media content may be such information as a name or brief introduction of the first media content. Optionally, in addition to the identifier of the first media content, the media information list may further include a resolution of the first media content, so that the control device determines, according to the resolution, the specific type of media data to which the first media content belongs.

It should be noted herein that, the user may specifically send the play instruction by clicking or double-clicking the first media content that the user wishes to play in the media information list, but is not limited thereto. For example, the user may also invoke a function menu of the media information list, and send, by using the function menu, the play instruction to the control device, for requesting to play the first media content.

Based on the foregoing description, that the control device determines whether the first media content belongs to the first type of media data includes comparing, by the control device, the resolution of the first media content with a resolution threshold corresponding to the first type of media data, and if the resolution of the first media content is greater than or equal to the resolution threshold, determining that the first media content belongs to the first type of media data. Further optionally, if the resolution of the first media content is smaller than the resolution threshold, the control device may determine that the first media content does not belong to the first type of media data.

In the embodiment of the present disclosure, in addition to determining whether the first media content belongs to the first type of media data, the control device further needs to determine whether at least one of the media source device and the media presentation device uses the second frequency band to access the wireless local area network, or whether the media source device and the media presentation device use the second frequency band to directly establish the connection. When the control device determines that the first media content belongs to the first type of media data, and that at least one of the media source device and the media presentation device uses the second frequency band to access the wireless local area network, or when the control device determines that the first media content belongs to the first type of media data, and that the media source device and the media presentation device use the second frequency band to directly establish the connection, the control device controls the media source device and the media presentation device to establish the connection in the first frequency band and transmit the first media content based on the connection. Thereby, the first frequency band may not be always used during large power consumption but is used only when media content needs to be transmitted, which is advantageous to saving power of related devices and may further improve transmission quality and playback quality of the first type of media data.

In an optional implementation manner, before the control device controls the media source device and the media presentation device to establish the connection in the first frequency band, the control device needs to determine that the media source device and the media presentation device may establish the connection in the first frequency band. For example, before the control device controls the media source device and the media presentation device to establish the connection in the first frequency band, the control device may acquire capability information of the media source device and/or capability information of the media presentation device, and determine, according to the capability information of the media source device and/or the capability information of the media presentation device, that the media source device and the media presentation device may establish the connection in the first frequency band.

The manner in which the control device determines that the media source device and the media presentation device may establish the connection in the first frequency band is hereinafter described in detail with reference to a specific manner in which the media source device and the media presentation device access the wireless local area network. In an optional implementation manner, both the media source device and the media presentation device use the second frequency band to access the wireless local area network in a wireless manner, or the media source device and the media presentation device use the second frequency band to directly establish the connection. In this case, that the control device determines that the media source device and the media presentation device may establish the connection in the first frequency band includes acquiring, by the control device, the capability information of the media source device and the media presentation device, and then determining, according to the capability information of the media source device and the media presentation device, that the media source device and the media presentation device may establish the connection in the first frequency band.

It should be noted herein that, the case in which both the media source device and the media presentation device use the second frequency band to access the wireless local area network in the wireless manner includes a case in which both the media source device and the media presentation device access the wireless local area network by using different frequency bands that are different from the first frequency band. In this case, the second frequency band includes two frequency bands that are different from the first frequency band. For example, the media source device and the media presentation device access the wireless local area network by using 2.4 GHz and 5 GHz respectively, and in this case, the first frequency band may refer to 60 GHz. Alternatively, the case in which both the media source device and the media presentation device use the second frequency band to access the wireless local area network in the wireless manner further includes a case in which one of the media source device and the media presentation device accesses the wireless local area network by using a frequency band different from the first frequency band, while the other one accesses the wireless local area network by using the first frequency band. In this case, the second frequency band includes a frequency band different from the first frequency band. For example, the media source device and the media presentation device access the wireless local area network by using 2.4 GHz and 5 GHz respectively, and in this case, the first frequency band may refer to 5 GHz.

In another optional implementation manner, one of the media source device and the media presentation device uses the second frequency band to access the wireless local area network, and the other one is connected to the router in the wireless local area network in the wired manner (for example, an Ethernet, a power line, or a cable). Bandwidth of a wired connection is relatively stable. The wired connection is not easily susceptible to interference, and also does not easily interfere with other devices, and therefore does not need to be switched to the first frequency band, and only the part on a wireless connection needs to be switched to the first frequency band. In this case, that the control device determines that the media source device and the media presentation device may establish the connection in the first frequency band includes: acquiring, by the control device, the capability information of the device using the second frequency band to access the wireless local area network, in the media source device and the media presentation device, and capability information of the router, and determining, according to the capability information of the device using the second frequency band to access the wireless local area network, in the media source device and the media presentation device, and the capability information of the router, that the device using the second frequency band to access the wireless local area network, in the media source device and the media presentation device, and the router may establish a connection in the first frequency band.

That one of the media source device and the media presentation device uses the second frequency band to access the wireless local area network, and the other one is connected to the router in the wireless local area network in the wired manner, includes the following cases. In one case, the media source device is connected to the router in the wired manner, while the media presentation device accesses the wireless local area network in the wireless manner by using the second frequency band. In another case, the media presentation device is connected to the router in the wired manner, while the media source device accesses the wireless local area network in the wireless manner by using the second frequency band. If the device using the second frequency band to access the wireless local area network, in the media source device and the media presentation device, is the media source device, the control device acquires the capability information of the media source device and the capability information of the router to which the media presentation device is connected, and then determines, according to the capability information of the media source device and the capability information of the router to which the media presentation device is connected, that the media source device and the router may establish the connection in the first frequency band. If the device using the second frequency band to access the wireless local area network, in the media source device and the media presentation device, is the media presentation device, the control device acquires the capability information of the media presentation device and the capability information of the router to which the media source device is connected, and then determines, according to the capability information of the media presentation device and the capability information of the router to which the media source device is connected, that the media source device and the router may establish the connection in the first frequency band.

It should be noted herein that, in a case in which both the media source device and the media presentation device are connected to the router in the wireless local area network in the wired manner from the beginning, the media source device and the media presentation device do not need to use the first frequency band to perform interaction, but may perform interaction by using an existing wired connection. However, in this case, when the first media content that needs to be transmitted belongs to the first type of media data, transmission may still be performed in the wireless connection manner by switching to the first frequency band, so that occupancy of bandwidth of an existing wired network may be reduced.

Optionally, the control device may acquire the capability information of the media source device and/or the capability information of the media presentation device by using the UPnP protocol. For example, the control device may define a UPnP action, for example, GetPHYInfo( ), and acquire the capability information of the media source device and/or the capability information of the media presentation device by using GetPHYInfo( ). The capability information of the media source device includes but is not limited to: operating frequency bands that can be supported by the media source device, information about a physical interface used for each supported operating frequency band, information about a currently used operating frequency band, and the like. Correspondingly, the capability information of the media presentation device includes but is not limited to operating frequency bands that can be supported by the media presentation device, information about a physical interface used for each supported operating frequency band, information about a currently used operating frequency band, and the like.

Optionally, the control device may also previously acquire the capability information of the media source device and/or the capability information of the media presentation device, and previously store the information locally. Based on this, the control device may, when necessary, directly acquire the locally pre-stored capability information of the media source device and/or capability information of the media presentation device.

In an optional implementation manner, if the control device determines that the first media content belongs to the first type of media data, and that both the media source device and the media presentation device use the second frequency band to access the wireless local area network in the wireless manner, or if the control device determines that the first media content belongs to the first type of media data, and that the media source device and the media presentation device use the second frequency band to directly establish the connection, the control device generates a parameter configuration used by the media source device and the media presentation device for transmitting the first media content in the first frequency band, and sends the parameter configuration to the media source device and the media presentation device separately, so that the media source device and the media presentation device establish the connection in the first frequency band and transmit the first media content based on the connection; or if the control device determines that the first media content belongs to the first type of media data, and that one of the media source device and the media presentation device accesses the wireless local area network in the wireless manner, and that the other one is connected to the router in the wireless local area network in the wired manner, the control device generates a parameter configuration used by the media source device and the media presentation device for transmitting the first media content in the first frequency band, and sends the parameter configuration to the device using the second frequency band to access the wireless local area network, in the media source device and the media presentation device, and sends the parameter configuration to the router, so that the media source device and the media presentation device establish the connection in the first frequency band by using the router and transmit the first media content based on the connection.

Based on the connection currently established in the second frequency band, the media source device and the media presentation device may negotiate to establish the connection in the first frequency band. After the connection is established in the first frequency band, the media source device and the media presentation device may disconnect or retain the connection in the second frequency band, specifically depending on capabilities of the media source device and the media presentation device.

It should be noted herein that, the parameter configuration includes but is not limited to the following information: a frequency band identifier (for example, a Channel ID) of the first frequency band, a physical interface (PHY) corresponding to the first frequency band, an identifier of a peer device, and an identifier of the wireless local area network. As the first frequency band varies, the frequency band identifier of the first frequency band and the corresponding physical interface may also vary. The peer device refers to a peer end of a device that receives the parameter configuration. In this embodiment, the identifier of the peer device refers to an identifier of the media source device or an identifier of the media presentation device, for example, may be information that may uniquely identify the peer device, such as a MAC address. When the parameter configuration is sent to the media source device, the identifier of the peer device refers to the identifier of the media presentation device; or when the parameter configuration is sent to the media presentation device, the identifier of the peer device refers to the identifier of the media source device. For example, if the media source device and the media presentation device establish the connection in the first frequency band in a direct connection manner (that is, without using the router), the identifier of the wireless local area network may be but is not limited to a service set identifier (SSID).

Further, to ensure security of data transmission, an encryption method may be used to perform encryption on a communication process between the media source device and the media presentation device. Based on this, the parameter configuration may further include such information as an encryption mode and an encryption key. The encryption mode may be but is not limited to Wi-Fi Protected Access 2 (WPA2).

After receiving the parameter configuration sent by the control device, the media source device and the media presentation device may know that they need to work in the first frequency band. In this case, if the media source device and the media presentation device already work in the first frequency band, the media source device may immediately transmit the first media content to the media presentation device by using the connection in the first frequency band; or if the media source device and the media presentation device do not work in the first frequency band yet, the media source device and the media presentation device enable the physical interface corresponding to the first frequency band, search for the peer end according to the parameter configuration, establish a wireless connection, and allocate an Internet Protocol (IP) address to the physical interface corresponding to the first frequency band, and then the media source device transmits the first media content to the media presentation device by using the connection in the first frequency band. In addition, the media presentation device may also directly acquire the first media content from the media source device by using the connection in the first frequency band, and play the first media content.

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

In this embodiment, when it is determined that media content that needs to be played belongs to a first type of media data, and that at least one of a media source device and a media presentation device uses a second frequency band to access a wireless local area network, or when it is determined that first media content belongs to a first type of media data, and that a media source device and a media presentation device use a second frequency band to directly establish a connection, a control device controls the media source device and the media presentation device to switch an operating frequency band from the second frequency band to a first frequency band suitable for transmitting the first type of media data, so that the media source device and the media presentation device establish a connection in the first frequency band and complete transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of the first type of media data. Further, the first type of media data is transmitted in the first frequency band, which is also advantageous to reducing interference on an existing service in the second frequency band.

Figure 2A:
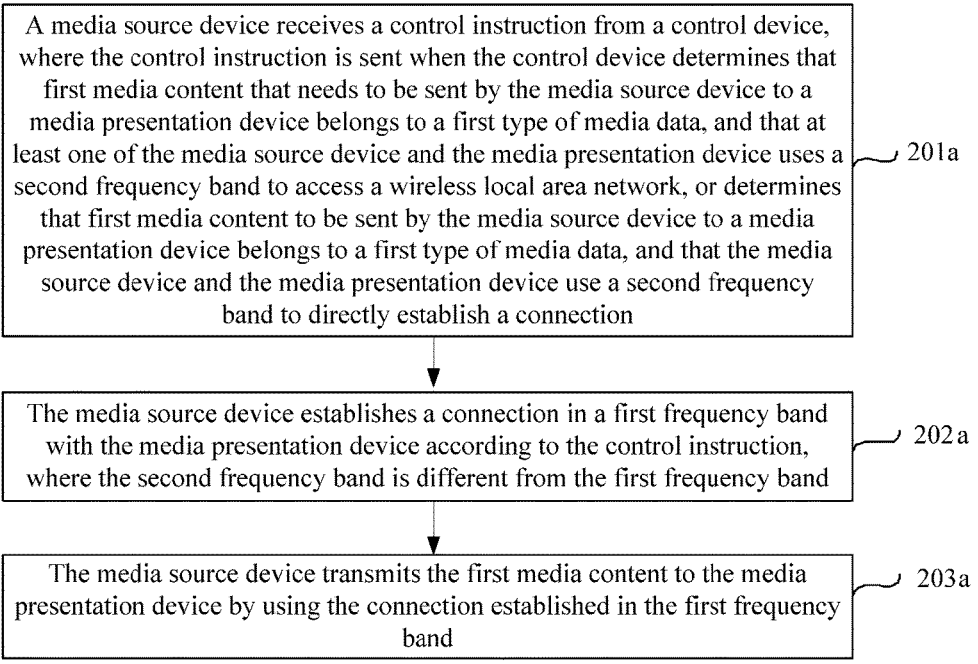
FIG. 2A is a flowchart of still another media data transmission method according to an embodiment of the present disclosure.

FIG. 2A is a flowchart of still another media data transmission method according to an embodiment of the present disclosure. As shown in FIG. 2A, the method includes the following steps.

201a. A media source device receives a control instruction from a control device, where the control instruction is sent when the control device determines that first media content that needs to be sent by the media source device to a media presentation device belongs to a first type of media data, and that at least one of the media source device and the media presentation device uses a second frequency band to access a wireless local area network, or determines that first media content to be sent by the media source device to a media presentation device belongs to a first type of media data, and that the media source device and the media presentation device use a second frequency band to directly establish a connection.

202a. The media source device establishes a connection in a first frequency band with the media presentation device according to the control instruction, where the second frequency band is different from the first frequency band.

203a. The media source device transmits the first media content to the media presentation device by using the connection established in the first frequency band.

In an optional implementation manner, the control instruction is a parameter configuration used by the media source device and the media presentation device for transmitting the first media content in the first frequency band. Based on this, that the media source device under control of the control device establishes a connection in a first frequency band with the media presentation device includes receiving, by the media source device, a parameter configuration sent by the control device, and establishing the connection in the first frequency band with the media presentation device according to the parameter configuration.

Figure 2B:
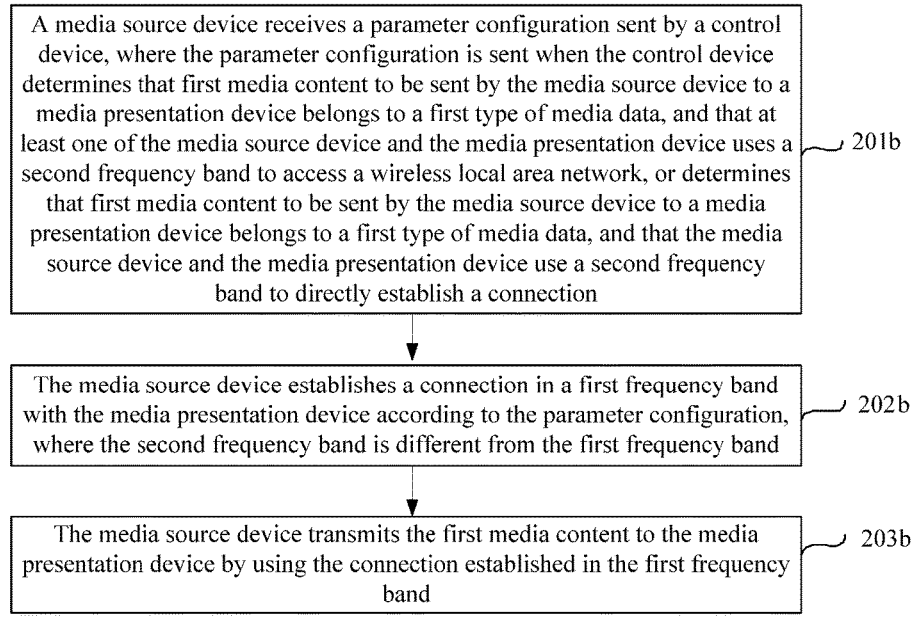
FIG. 2B is a flowchart of still another media data transmission method according to an embodiment of the present disclosure.

Based on the foregoing description, a flowchart of still another media data transmission method provided by an embodiment of the present disclosure is shown in FIG. 2B and includes:

201b. A media source device receives a parameter configuration sent by a control device, where the parameter configuration is sent when the control device determines that first media content to be sent by the media source device to a media presentation device belongs to a first type of media data, and that at least one of the media source device and the media presentation device uses a second frequency band to access a wireless local area network, or determines that first media content to be sent by the media source device to a media presentation device belongs to a first type of media data, and that the media source device and the media presentation device use a second frequency band to directly establish a connection.

202b. The media source device establishes a connection in a first frequency band with the media presentation device according to the parameter configuration, where the second frequency band is different from the first frequency band.

203b. The media source device transmits the first media content to the media presentation device by using the connection established in the first frequency band.

It should be noted herein that, in this embodiment, the access to the wireless local area network by the media source device in a wireless manner may specifically be accessing the wireless local area network by using a frequency band different from the first frequency band, or may be accessing the wireless local area network by using the first frequency band. The media presentation device may access the wireless local area network in the wireless manner, or may be connected to a router in the wireless local area network in a wired manner. Regardless of whether the media presentation device accesses the wireless local area network in the wireless manner or is connected to the router in the wireless local area network in the wired manner, at least one of the media source device and the media presentation device uses a frequency band (namely, the second frequency band) different from the first frequency band to access the wireless local area network, or the media source device and the media presentation device use a frequency band (namely, the second frequency band) different from the first frequency band to directly establish a connection.

In this embodiment, the media source device may be any device that is capable of providing media content, and the media presentation device may be any device that is capable of playing media content, for example, a TV or a PC. In this embodiment, the media source device under control of the control device transmits media content to the media presentation device, and then the media presentation device plays the media content. The control device may be any device that has a control function, for example, a mobile phone of a user.

It should be noted herein that, the control device may be implemented as an independent device, or may be integrated with the media source device or the media presentation device for implementation. The embodiment of the present disclosure is described by using an example in which the control device is an independent device, but is not limited thereto.

In this embodiment, media data may be classified into at least two types. The first type of media data mainly refers to media data that is suitable for transmission in the first frequency band, for example, may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p). Definitions of other types of media data than the first type of media data and frequency bands in which the other types of media data are suitable for transmission, are not limited in the embodiment of the present disclosure.

When it is determined that the first media content requested by the media presentation device from the media source device belongs to the first type of media data, and that at least one of the media source device and the media presentation device uses the second frequency band to access the wireless local area network, or when it is determined that the first media content requested by the media presentation device from the media source device belongs to the first type of media data, and that the media source device and the media presentation device use the second frequency band to directly establish the connection, the control device controls the media source device and the media presentation device to establish the connection in the first frequency band and transmit the first media content based on the established connection. The media source device receives a control instruction from the control device, establishes the connection in the first frequency band with the media presentation device according to the control instruction, and then transmits the first media content to the media presentation device by using the connection established in the first frequency band. The media presentation device also receives a control instruction from the control device, establishes the connection in the first frequency band with the media source device according to the control instruction, and then transmits the first media content based on the connection established in the first frequency band.

In an optional implementation manner, when it is determined that the first media content belongs to the first type of media data, and that both the media source device and the media presentation device use the second frequency band to access the wireless local area network, or when it is determined that the first media content requested by the media presentation device from the media source device belongs to the first type of media data, and that the media source device and the media presentation device use the second frequency band to directly establish the connection, the control device generates the parameter configuration used by the media source device and the media presentation device for transmitting the first media content in the first frequency band, and then sends the parameter configuration to the media source device and the media presentation device, so that the media source device and the media presentation device establish the connection in the first frequency band; or when it is determined that the first media content belongs to the first type of media data, and that one of the media source device and the media presentation device uses the second frequency band to access the wireless local area network, and that the other one is connected to the router in the wireless local area network in the wired manner, the control device generates the parameter configuration used by the media source device and the media presentation device for transmitting the first media content in the first frequency band, and then sends the parameter configuration to the device using the second frequency band to access the wireless local area network, in the media source device and the media presentation device, and the router, so that the media source device and the media presentation device establish the connection in the first frequency band by using the router.

Based on the foregoing description, that the media source device establishes the connection in the first frequency band with the media presentation device according to the control instruction includes, if the media source device uses the second frequency band to access the wireless local area network, receiving, by the media source device, the parameter configuration sent by the control device, and then establishing the connection in the first frequency band with the media presentation device according to the parameter configuration. Correspondingly, if the media presentation device uses the second frequency band to access the wireless local area network, the media presentation device also receives the parameter configuration sent by the control device, and establishes the connection in the first frequency band with the media source device according to the parameter configuration.

After receiving the parameter configuration sent by the control device, the media source device and the media presentation device may know that they need to work in the first frequency band. In this case, if the media source device and the media presentation device already work in the first frequency band, the media source device may immediately transmit the first media content to the media presentation device by using the connection in the first frequency band; or if the media source device and the media presentation device do not work in the first frequency band yet, the media source device and the media presentation device immediately enable a physical interface corresponding to the first frequency band, search for the peer end according to the parameter configuration, establish a wireless connection, and allocate an IP address to the physical interface corresponding to the first frequency band, and then the media source device transmits the first media content to the media presentation device by using the connection in the first frequency band.

It should be noted herein that, the parameter configuration includes but is not limited to the following information: a frequency band identifier (Channel ID) of the first frequency band, a physical interface (PHY) corresponding to the first frequency band, an identifier of a peer device, and an identifier of the wireless local area network. As the first frequency band varies, the frequency band identifier of the first frequency band and corresponding physical interface may also vary. In this embodiment, the parameter configuration is sent to the media source device. Therefore, the identifier of the peer device refers to an identifier of the media presentation device, for example, may be information that may uniquely identify the media presentation device, such as a MAC address of the media presentation device. For example, if the media source device and the media presentation device establish the connection in the first frequency band in a direct connection manner (that is, without using the router), the identifier of the wireless local area network may be but is not limited to an SSID.

Further, to ensure security of data transmission, an encryption method may be used to perform encryption on a communication process between the media source device and the media presentation device. Based on this, the parameter configuration may further include such information as an encryption mode and an encryption key. The encryption mode may be but is not limited to WPA2.

In this embodiment, if the first type of media data is media data requiring large transmission bandwidth, for example, high definition media data, full high definition media data, or ultra high definition media data, the first frequency band is higher than the first frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

In an optional implementation manner, before the media source device establishes the connection in the first frequency band with the media presentation device according to the control instruction from the control device, the method includes providing, by the media source device, capability information of the media source device for the control device, so that the control device determines, according to the capability information of the media source device, whether the media source device and the media presentation device may establish the connection in the first frequency band. For example, the media source device may provide the capability information of the media source device for the control device by using the UPnP protocol.

It should be noted herein that, if the peer end cannot be searched out in the first frequency band, or signals in the first frequency band are weak, the media source device and the media presentation device may fall back to a previous connection manner, that is, may fall back to the second frequency band.

In addition, to reduce an initial waiting time when the media presentation device plays the first media content, before establishing the connection in the first frequency band with the media presentation device, the media source device under control of the control device may transmit some data of the first media content to the media presentation device by using the connection established in the second frequency band with the media presentation device. Based on this, that the media source device transmits the first media content to the media presentation device by using the connection established in the first frequency band, includes transmitting, by the media source device, other data of the first media content to the media presentation device by using the connection established in the first frequency band, where the other data has not been transmitted by using the connection established in the second frequency band.

Further optionally, to save resources, after transmission of the first media content is completed, the media source device and the media presentation device automatically disable the connection in the first frequency band and the corresponding physical interface, and actively fall back to the second frequency band.

This embodiment is described from a perspective of a media source device. As may be seen from the foregoing description, a media source device and a media presentation device under control of a control device switch from a first frequency band to a first frequency band only when media content needs to be transmitted by using the first frequency band, establish a connection in the first frequency band, and complete transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of a first type of media data. Further, the first type of media data is transmitted in the first frequency band, which is also advantageous to reducing interference on an existing service in the second frequency band.

Figure 3A:
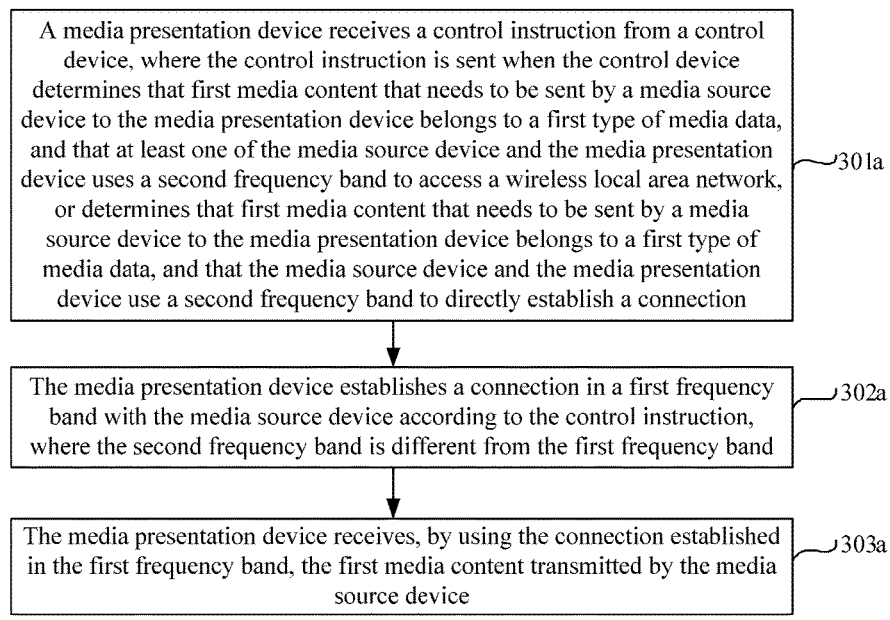
FIG. 3A is a flowchart of still another media data transmission method according to an embodiment of the present disclosure.

FIG. 3A is a flowchart of still another media data transmission method according to an embodiment of the present disclosure. As shown in FIG. 3A, the method includes the following steps.

301a. A media presentation device receives a control instruction from a control device, where the control instruction is sent when the control device determines that first media content that needs to be sent by a media source device to the media presentation device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection.

302a. The media presentation device establishes a connection in a first frequency band with the media source device according to the control instruction, where the second frequency band is different from the first frequency band.

303a. The media presentation device receives, by using the connection established in the first frequency band, the first media content transmitted by the media source device.

In an optional implementation manner, the control instruction from the control device is a parameter configuration used by the media presentation device and the media source device for transmitting the first media content in the first frequency band. Based on this, that the media presentation device establishes a connection in a first frequency band with the media source device according to the control instruction from the control device may include receiving, by the media presentation device, a parameter configuration sent by the control device, and establishing the connection in the first frequency band with the media source device according to the parameter configuration.

Figure 3B:
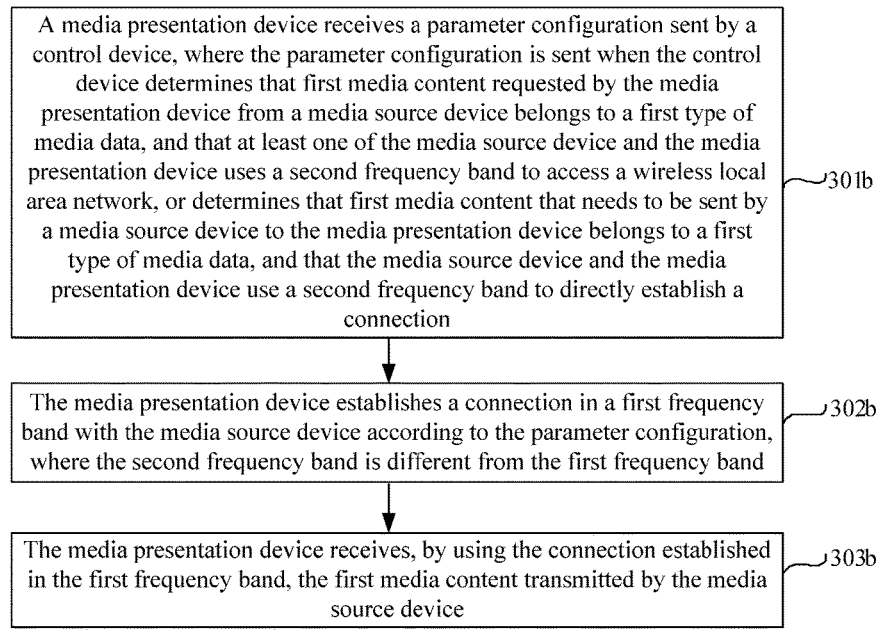
FIG. 3B is a flowchart of still another media data transmission method according to an embodiment of the present disclosure.

Based on the foregoing description, a flowchart of still another media data transmission method provided by an embodiment of the present disclosure is shown in FIG. 3B and includes the following steps.

301b. A media presentation device receives a parameter configuration sent by a control device, where the parameter configuration is sent when the control device determines that first media content requested by the media presentation device from a media source device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection.

302b. The media presentation device establishes a connection in a first frequency band with the media source device according to the parameter configuration, where the second frequency band is different from the first frequency band.

303b. The media presentation device receives, by using the connection established in the first frequency band, the first media content transmitted by the media source device.

It should be noted herein that, in this embodiment, the access to the wireless local area network by the media presentation device in a wireless manner may be accessing the wireless local area network by using a frequency band different from the first frequency band, or may be accessing the wireless local area network by using the first frequency band. The media source device may access the wireless local area network in the wireless manner, or may be connected to a router in the wireless local area network in a wired manner. Regardless of whether the media source device accesses the wireless local area network in the wireless manner or is connected to the router in the wireless local area network in the wired manner, at least one of the media source device and the media presentation device uses a frequency band (namely, the second frequency band) different from the first frequency band to access the wireless local area network, or the media source device and the media presentation device use a frequency band (namely, the second frequency band) different from the first frequency band to directly establish a connection.

In this embodiment, the media source device may be any device that is capable of providing media content, and the media presentation device may be any device that is capable of playing media content, for example, a TV or a PC. In this embodiment, the media source device under control of the control device transmits media content to the media presentation device, and then the media presentation device plays the media content. The control device may be any device that has a control function, for example, a mobile phone of a user.

It should be noted herein that, the control device may be implemented as an independent device, or may be integrated with the media source device or the media presentation device for implementation. The embodiment of the present disclosure is described by using an example in which the control device is an independent device, but is not limited thereto.

In this embodiment, media data may be classified into at least two types. The first type of media data mainly refers to media data that is suitable for transmission in the first frequency band, for example, may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p). Definitions of other types of media data than the first type of media data and frequency bands in which the other types of media data are suitable for transmission, are not limited in the embodiment of the present disclosure.

When it is determined that the first media content requested by the media presentation device from the media source device belongs to the first type of media data, and that at least one of the media source device and the media presentation device uses the second frequency band to access the wireless local area network, or when it is determined that the first media content requested by the media presentation device from the media source device belongs to the first type of media data, and that the media source device and the media presentation device use the second frequency band to directly establish the connection, the control device controls the media source device and the media presentation device to establish the connection in the first frequency band and transmit the first media content based on the established connection. The media source device receives a control instruction from the control device, establishes the connection in the first frequency band with the media presentation device according to the control instruction, and then transmits the first media content to the media presentation device by using the connection established in the first frequency band. The media presentation device also receives a control instruction from the control device, establishes the connection in the first frequency band with the media source device according to the control instruction, and then transmits the first media content based on the connection established in the first frequency band.

In an optional implementation manner, when it is determined that the first media content belongs to the first type of media data, and that both the media source device and the media presentation device use the second frequency band to access the wireless local area network, or when it is determined that the first media content requested by the media presentation device from the media source device belongs to the first type of media data, and that the media source device and the media presentation device use the second frequency band to directly establish the connection, the control device generates the parameter configuration used by the media source device and the media presentation device for transmitting the first media content in the first frequency band, and then sends the parameter configuration to the media source device and the media presentation device, so that the media source device and the media presentation device establish the connection in the first frequency band; or when it is determined that the first media content belongs to the first type of media data, and that one of the media source device and the media presentation device uses the second frequency band to access the wireless local area network, and that the other one is connected to the router in the wireless local area network in the wired manner, the control device generates the parameter configuration used by the media source device and the media presentation device for transmitting the first media content in the first frequency band, and then sends the parameter configuration to the device using the second frequency band to access the wireless local area network, in the media source device and the media presentation device, and the router, so that the media source device and the media presentation device establish the connection in the first frequency band by using the router.

Based on the foregoing description, that the media presentation device establishes the connection in the first frequency band with the media source device according to the control instruction includes, if the media presentation device uses the second frequency band to access the wireless local area network, receiving, by the media presentation device, the parameter configuration sent by the control device, and then establishing the connection in the first frequency band with the media source device according to the parameter configuration. Correspondingly, if the media source device uses the second frequency band to access the wireless local area network, the media source device also receives the parameter configuration sent by the control device, and establishes the connection in the first frequency band with the media presentation device according to the parameter configuration.

After receiving the parameter configuration sent by the control device, the media presentation device and the media source device may know that they need to work in the first frequency band. In this case, if the media source device and the media presentation device already work in the first frequency band, the media source device may immediately transmit the first media content to the media presentation device by using the connection in the first frequency band; or if the media source device and the media presentation device do not work in the first frequency band yet, the media source device and the media presentation device immediately enable a physical interface corresponding to the first frequency band, search for the peer end according to the parameter configuration, establish a wireless connection, and allocate an IP address to the physical interface corresponding to the first frequency band, and then the media source device transmits the first media content to the media presentation device by using the connection in the first frequency band.

It should be noted herein that, the parameter configuration includes but is not limited to the following information: a frequency band identifier (Channel ID) of the first frequency band, a physical interface (PHY) corresponding to the first frequency band, an identifier of a peer device, and an identifier of the wireless local area network. As the first frequency band varies, the frequency band identifier of the first frequency band and the corresponding physical interface may also vary. In this embodiment, the parameter configuration is sent to the media presentation device. Therefore, the identifier of the peer device refers to an identifier of the media source device, for example, may be information that may uniquely identify the media source device, such as a MAC address of the media source device. For example, if the media source device and the media presentation device establish the connection in the first frequency band in a direct connection manner (that is, without using the router), the identifier of the wireless local area network may be but is not limited to an SSID.

Further, to ensure security of data transmission, an encryption method may be used to perform encryption on a communication process between the media source device and the media presentation device. Based on this, the parameter configuration may further include such information as an encryption mode and an encryption key. The encryption mode may be but is not limited to WPA2.

In this embodiment, if the first type of media data is media data requiring large transmission bandwidth, for example, high definition media data, full high definition media data, or ultra high definition media data, the first frequency band are higher than the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

In an optional implementation manner, before the media presentation device establishes the connection in the first frequency band with the media source device according to the control instruction from the control device, the method includes providing, by the media presentation device, capability information of the media presentation device for the control device, so that the control device determines, according to the capability information of the media presentation device, whether the media source device and the media presentation device may establish the connection in the first frequency band. For example, the media presentation device may provide the capability information of the media presentation device for the control device by using the UPnP protocol.

It should be noted herein that, if the peer end cannot be searched out in the first frequency band, or signals in the first frequency band are weak, the media source device and the media presentation device may fall back to a previous connection manner, that is, may fall back to the second frequency band.

In addition, to reduce an initial waiting time when the media presentation device plays the first media content, before establishing the connection in the first frequency band with the media source device, the media presentation device under control of the control device may receive, by using the connection established in the second frequency band with the media source device, some data of the first media content transmitted by the media source device. Based on this, that the media presentation device receives, by using the connection established in the first frequency band, the first media content transmitted by the media source device, includes receiving, by the media presentation device by using the connection established in the first frequency band, other data of the first media content transmitted by the media source device, where the other data has not been transmitted by using the connection established in the first frequency band.

Further optionally, to save resources, after transmission of the first media content is completed, the media source device and the media presentation device automatically disable the connection in the first frequency band and the corresponding physical interface, and actively fall back to the second frequency band.

This embodiment is described from a perspective of a media presentation device. As may be seen from the foregoing description, a media presentation device and a media source device under control of a control device switch from a first frequency band to a first frequency band only when media content needs to be transmitted by using the first frequency band, establish a connection in the first frequency band, and complete transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of a first type of media data. Further, the first type of media data is transmitted in the first frequency band, which is also advantageous to reducing interference on an existing service in the second frequency band.

Figure 4A:
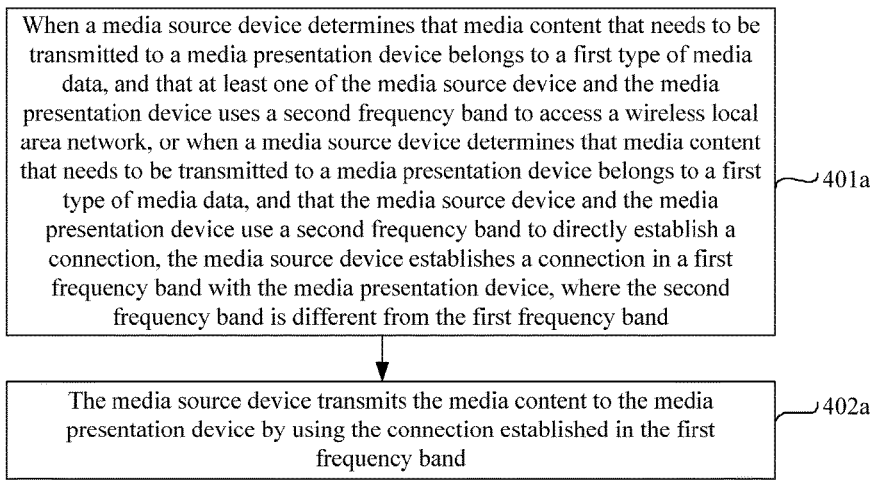
FIG. 4A is a flowchart of still another media data transmission method according to an embodiment of the present disclosure.

FIG. 4A is a flowchart of still another media data transmission method according to an embodiment of the present disclosure. As shown in FIG. 4A, the method includes the following steps.

401a. When a media source device determines that media content that needs to be transmitted to a media presentation device belongs to a first type of media data, and that at least one of the media source device and the media presentation device uses a second frequency band to access a wireless local area network, or when a media source device determines that media content that needs to be transmitted to a media presentation device belongs to a first type of media data, and that the media source device and the media presentation device use a second frequency band to directly establish a connection, the media source device establishes a connection in a first frequency band with the media presentation device, where the second frequency band is different from the first frequency band.

402a. The media source device transmits the media content to the media presentation device by using the connection established in the first frequency band.

In an optional implementation manner, before the media source device establishes the connection in the first frequency band with the media presentation device, the method further includes acquiring, by the media source device, capability information of the media presentation device, and determining, according to capability information of the media source device and/or the capability information of the media presentation device, that the media source device and the media presentation device may establish the connection in the first frequency band.

In an optional implementation manner, that the media source device establishes a connection in a first frequency band with the media presentation device includes generating, by the media source device, a parameter configuration used by the media source device and the media presentation device for transmitting the media content in the first frequency band, and sending the parameter configuration to the media presentation device, to establish the connection in the first frequency band with the media presentation device.

Figure 4B:
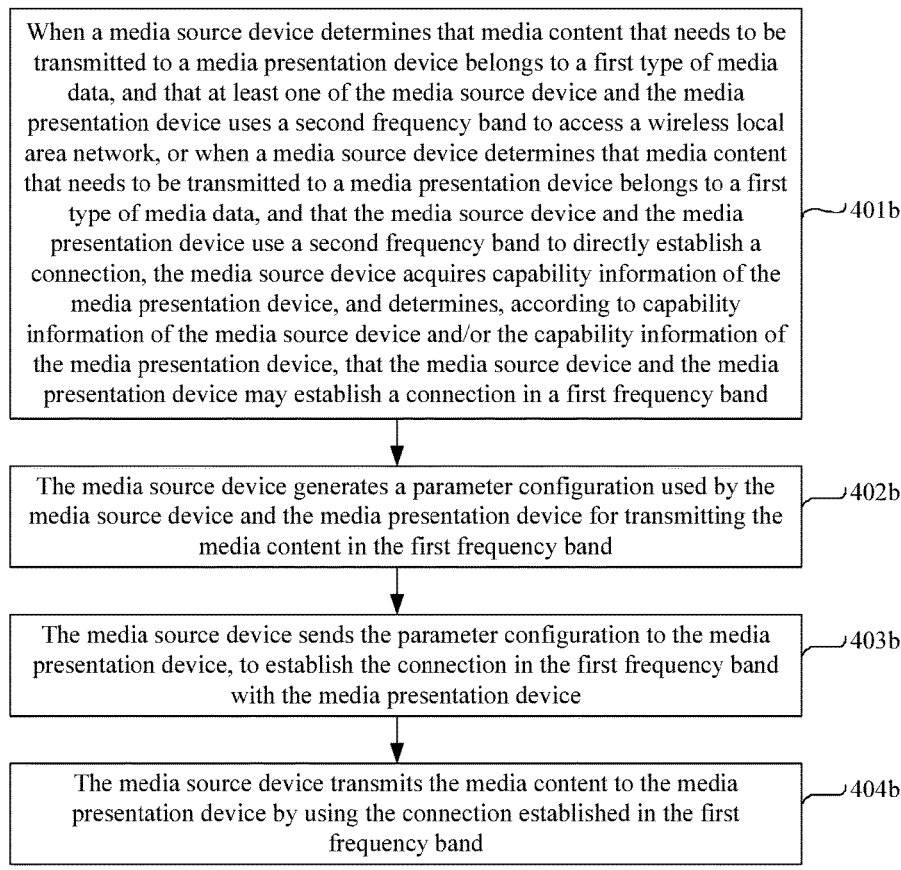
FIG. 4B is a flowchart of still another media data transmission method according to an embodiment of the present disclosure.

Based on the foregoing description, a flowchart of still another media data transmission method provided by an embodiment of the present disclosure is shown in FIG. 4B and includes the following steps.

401b. When a media source device determines that media content that needs to be transmitted to a media presentation device belongs to a first type of media data, and that at least one of the media source device and the media presentation device uses a second frequency band to access a wireless local area network, or when a media source device determines that media content that needs to be transmitted to a media presentation device belongs to a first type of media data, and that the media source device and the media presentation device use a second frequency band to directly establish a connection, the media source device acquires capability information of the media presentation device, and determines, according to capability information of the media source device and/or the capability information of the media presentation device, that the media source device and the media presentation device may establish a connection in a first frequency band.

402b. The media source device generates a parameter configuration used by the media source device and the media presentation device for transmitting the media content in the first frequency band.

403b. The media source device sends the parameter configuration to the media presentation device, to establish the connection in the first frequency band with the media presentation device.

404b. The media source device transmits the media content to the media presentation device by using the connection established in the first frequency band.

In the embodiment of the present disclosure, the media source device may be any device that is capable of providing media content, and the media presentation device may be any device that is capable of playing media content, for example, a TV or a PC.

In an actual application, when a user wishes to play a piece of media content by using a media presentation device, the user may send a play instruction to the media source device, where the play instruction is used to instruct the media presentation device to request to acquire specified media content from the media source device.

Based on the foregoing description, the media source device determines whether the media content that the user requests to play in the media presentation device belongs to the first type of media data. In this embodiment, media data may be classified into at least two types. The first type of media data mainly refers to media data that is suitable for transmission in the first frequency band, for example, may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p). Definitions of other types of media data than the first type of media data and frequency bands in which the other types of media data are suitable for transmission, are not limited in the embodiment of the present disclosure.

Optionally, that the media source device determines whether the media content that the user requests to play in the media presentation device belongs to the first type of media data includes comparing, by the media source device, a resolution of the media content requested by the user with a resolution threshold corresponding to the first type of media data; and if the resolution of the media content requested by the user is greater than or equal to the resolution threshold, determining that the media content requested by the user belongs to the first type of media data; otherwise, determining that the media content requested by the user does not belong to the first type of media data.

When it is determined that the media content that the user requests to play in the media presentation device belongs to the first type of media data, and that at least one of the media source device and the media presentation device uses the second frequency band to access the wireless local area network, or when it is determined that the media content that needs to be transmitted to the media presentation device belongs to the first type of media data, and that the media source device and the media presentation device use the second frequency band to directly establish the connection, the media source device establishes the connection in the first frequency band with the media presentation device, and transmits the media content requested by the user to the media presentation device by using connection established in the first frequency band. Thereby, the first frequency band may not be always used during large power consumption but is used under control of the control device only when media content needs to be transmitted, which is advantageous to saving power of the media source device and the media presentation device and may further improve transmission quality and playback quality of the first type of media data. Further, the first type of media data is transmitted in the first frequency band, which is also advantageous to reducing interference on an existing service in the second frequency band.

Optionally, that the media source device acquires capability information of the media presentation device includes but is not limited to the following manners.

The media source device acquires the capability information of the media presentation device by using the UPnP protocol. For example, the media source device may define a UPnP action, for example, GetPHYInfo( ), and acquire the capability information of the media presentation device by using GetPHYInfo( ). The capability information of the media presentation device includes but is not limited to operating frequency bands that can be supported by the media presentation device, information about a physical interface used for each supported operating frequency band, information about a currently used operating frequency band, and the like. Correspondingly, the capability information of the media source device includes but is not limited to operating frequency bands that can be supported by the media source device, information about a physical interface used for each supported operating frequency band, information about a currently used operating frequency band, and the like.

Alternatively, the media source device acquires the capability information of the media presentation device by using Wi-Fi MAC layer signaling.

Alternatively, the media source device acquires the capability information of the media presentation device by using a RTSP message.

In an optional implementation manner, both the media source device and the media presentation device use the second frequency band to access the wireless local area network in a wireless manner, or the media source device and the media presentation device use the second frequency band to directly establish the connection. In this case, that the media source device determines, according to capability information of the media source device and/or the capability information of the media presentation device, that the media source device and the media presentation device may establish the connection in the first frequency band includes determining, by the media source device according to the capability information of the media source device and the capability information of the media presentation device, that the media source device and the media presentation device may establish the connection in the first frequency band.

It should be noted herein that, the case in which both the media source device and the media presentation device access the wireless local area network in the wireless manner includes a case in which both the media source device and the media presentation device access the wireless local area network by using different frequency bands that are different from the first frequency band. In this case, the second frequency band includes two frequency bands that are different from the first frequency band. For example, the media source device and the media presentation device access the wireless local area network by using 2.4 GHz and 5 GHz respectively, and in this case, the first frequency band may refer to 60 GHz. Alternatively, the case in which both the media source device and the media presentation device access the wireless local area network in the wireless manner further includes a case in which one of the media source device and the media presentation device accesses the wireless local area network by using a frequency band different from the first frequency band, while the other one accesses the wireless local area network by using the first frequency band. In this case, the second frequency band includes a frequency band different from the first frequency band. For example, the media source device and the media presentation device access the wireless local area network by using 2.4 GHz and 5 GHz respectively, and in this case, the first frequency band may refer to 5 GHz.

In an optional implementation manner, one of the media source device and the media presentation device uses the second frequency band to access the wireless local area network, and the other one is connected to a router in the wireless local area network in a wired manner (for example, an Ethernet, a power line, or a cable). Bandwidth of a wired connection is relatively stable. The wired connection is not easily susceptible to interference, and also does not easily interfere with other devices, and therefore does not need to be switched to the first frequency band, and only the part on a wireless connection needs to be switched to the first frequency band. Based on this, that the media source device determines, according to capability information of the media source device and/or the capability information of the media presentation device, that the media source device and the media presentation device may establish the connection in the first frequency band, includes determining, by the media source device according to both the capability information of the device using the second frequency band to access the wireless local area network, in the media source device and the media presentation device, and capability information of the router, that the device using the second frequency band to access the wireless local area network, in the media source device and the media presentation device, and the router may establish a connection in the first frequency band.

That one of the media source device and the media presentation device uses the second frequency band to access the wireless local area network, and the other one is connected to the router in the wireless local area network in the wired manner, includes the following cases. In one case, the media source device is connected to the router in the wired manner, while the media presentation device accesses the wireless local area network in the wireless manner by using the second frequency band. In another case, the media presentation device is connected to the router in the wired manner, while the media source device accesses the wireless local area network in the wireless manner by using the second frequency band.

It should be noted herein that, the parameter configuration generated by the media source device includes but is not limited to the following information: a frequency band identifier (Channel ID) of the first frequency band, a physical interface (PHY) corresponding to the first frequency band, an identifier of a peer device, and an identifier of the wireless local area network. As the first frequency band varies, the frequency band identifier of the first frequency band and the corresponding physical interface may also vary. In this embodiment, the parameter configuration is sent by the media source device to the media presentation device. Therefore, the identifier of the peer device refers to an identifier of the media source device, for example, information that may uniquely identify the media source device, such as a MAC address of the media source device. For example, if the media source device and the media presentation device establish the connection in the first frequency band in a direct connection manner (that is, without using the router), the identifier of the wireless local area network may be but is not limited to an SSID.

Further, to ensure security of data transmission, an encryption method may be used to perform encryption on a communication process between the media source device and the media presentation device. Based on this, the parameter configuration may further include such information as an encryption mode and an encryption key. The encryption mode may be but is not limited to WPA2.

Optionally, if the media source device and the media presentation device already work in the first frequency band, the media source device may immediately transmit the media content to the media presentation device by using the connection established in the first frequency band; or if the media source device and the media presentation device do not work in the first frequency band yet, the media source device and the media presentation device immediately enable the physical interface corresponding to the first frequency band, search for the peer end according to the parameter configuration, establish a wireless connection, and allocate an IP address to the physical interface corresponding to the first frequency band, and then the media source device transmits the media content to the media presentation device by using the connection in the first frequency band.

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

In addition, to reduce an initial waiting time when the media presentation device plays the media content, before the media source device establishes the connection in the first frequency band with the media presentation device, the method includes transmitting, by the media source device, some data of the media content to the media presentation device by using the connection established in the second frequency band with the media presentation device. Based on this, that the media source device transmits the media content to the media presentation device by using the connection established in the first frequency band includes transmitting, by the media source device, other data of the media content to the media presentation device by using the connection established in the first frequency band, where the other data has not been transmitted by using the connection established in the second frequency band.

Further optionally, to save resources, after transmission of the media content is completed, the media source device and the media presentation device may automatically disable the connection in the first frequency band and the corresponding physical interface, and actively fall back to the second frequency band.

In this embodiment, when it is determined that media content that a user requests to play belongs to a first type of media data, and that at least one of a media source device and a media presentation device uses a second frequency band to access a wireless local area network, or when it is determined that media content that needs to be transmitted to a media presentation device belongs to a first type of media data, and that a media source device and the media presentation device use a second frequency band to directly establish a connection, the media source device establishes a connection in a first frequency band with the media presentation device and completes transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of the first type of media data. Further, the first type of media data is transmitted in the first frequency band, which is also advantageous to reducing interference on an existing service in the second frequency band.

The methods provided by the foregoing embodiments of the present disclosure may be applicable to a digital home network, but are not limited thereto. The technical solution of the present disclosure is hereinafter further described by using multiple currently existing major standards in the industry that are established for implementing interconnection and interworking and content sharing between electronic devices in a home network.

Currently, major organizations for establishing standards for implementing interconnection and interworking and content sharing between electronic devices in a home network in the industry include the UPnP, the Digital Living Network Alliance (DLNA f), the Wi-Fi Alliance, the Intelligent Grouping and Resource Sharing (IGRS), and the like. The UPnP defines an audio and video (AV) standard. The standard defines two types of UPnP devices: a media server (MS) and a media renderer (MR), and in addition, further defines a control point (CP) for operating the MS and the MR. A user may implement playing on the MR of media content from the MS by operating the CP, and implement sharing of media data between devices in the home network. On a basis of the UPnP AV standard, the DLNA defines devices such as a digital media player (DMP), a digital media renderer (DMR), a digital media server (DMS), and a digital media controller (DMC). Similarly, the Wi-Fi Display (WFD) standard established by the Wi-Fi Alliance is also used for sharing media data between devices such as a mobile phone and a TV in the home network. The WFD standard lays more emphasis on encoding a screen picture of a source device (Source) in real time and sending the screen picture to a receiver device (Sink), so that a small-screen device such as a mobile phone or a tablet computer projects the screen to a large-screen device such as a TV or a projector for displaying.

It should be noted herein that, the media source device in the foregoing embodiment may be an MS, the media presentation device may be an MR, and the control device may be a CP; or the media source device in the foregoing embodiment may be a DMS, the media presentation device may be a DMP, and the control device may be a DMC.

Figure 5:
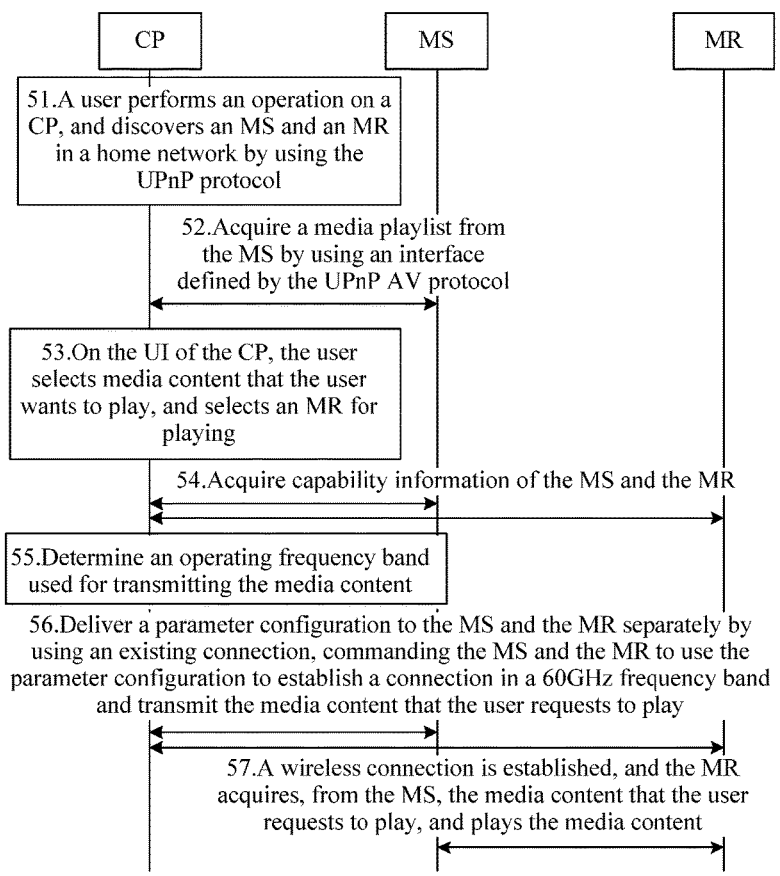
FIG. 5 is a flowchart of still another media data transmission method according to an embodiment of the present disclosure.

First, the DLNA standard is used as an example for description. Three user operation models defined by the DLNA include 2-Box Pull, 2-Box Push, and 3-Box. For example, that the user performs an operation on a TV and thereby acquires content from a network attached storage (NAS) and plays the content belongs to an application in 2-Box Pull. For example, that the user performs an operation on a mobile phone to push local content to a TV for playing belongs to an application in 2-Box Push. For example, that the user browses a media directory in a NAS by using a mobile phone and controls playing on a TV belongs to an application in 3-Box. In this embodiment, a general scenario of 3-Box is improved, and a new media data transmission method is provided, as shown in FIG. 5. The method includes the following steps.

51. A user performs an operation on a CP, and discovers an MS and an MR in a home network by using the UPnP protocol.

52. Subsequently, the CP acquires a media information list from the MS by using an interface (Browse) defined by the UPnP AV protocol, and displays the media information list on a user interface (UI) for the user to make a selection.

For example, the CP may be a mobile phone, the MS may be a NAS, and the MR may be a TV or the like.

In this embodiment, a description of media content on the MS is extended, and a resolution of media content is added, so that the CP can select different transmission modes for different media content according to the resolution. For example, a resolution (definition) field may be defined, and values of the field may include standard definition 480p (SD), high definition 720p (HD), full high definition 1080p (FHD), ultra high definition 4K (UHD-4K), ultra high definition 8K (UHD-8K), and the like. For example, the following statements may be used for defining the resolution field:

```
<ContentList>
   <item id="8" folder="/video/movie/ABC">
   <title>Film ABC</title>
   <res protocolInfo="http-get:*:video/avi:*" size="40G"
   def="UHD-4K">
   http://192.168.1.10/video/movie/ABC.avi
   </res>
</item>
<item id="3" folder="/video/cam/Family 2013">
<title>Spring Festival 2013</dc:title>
<res protocolInfo="http-get:*:video/mpeg:*" size="200M" def="FHD">
http://192.168.1.10/video/cam/2013001.mp4
</res>
</item>
...
</ContentList>
```

53. On the UI of the CP, the user selects media content that the user wants to play, and selects an MR for playing.

54. In this case, the CP knows the media content that the user selects to play and the resolution of the media content, and when detecting, according to the resolution of the media content, that the media content that the user selects to play is media content of a high resolution (for example, UHD or FHD), the CP acquires capability information of the MS and the MR. The capability information herein includes a supported operating frequency band, a physical interface corresponding to the supported operating frequency band, and the like.

For example, the CP may acquire the capability information of the MS and the MR separately by defining a UPnP action such as GetPHYInfo( ). The following is an example of the description of the capability information returned by the MS and the MR.

```
<PHYInterfaces>
   <PHYInterface>
      <InUse>1</InUse>
      <Type>802.11b/g/n-2.4G</Type>
   </PHYInterface>
   <PHYInterface>
      <InUse>0</InUse>
      <Type>802.11n-5G</Type>
   </PHYInterface>
   <PHYInterface>
      <InUse>0</InUse>
      <Type>802.11ad-60G</Type>
   </PHYInterface>
   <PHYInterface>
      <InUse>0</InUse>
      <Type>802.3-GE</Type>
   </PHYInterface>
   ...
   <PHY Interfaces>
```

By using the foregoing capability information, the CP may know whether the MS and the MR support a physical interface that is suitable for high-bit-rate media data transmission, for example, whether an 802.11ad interface or a 5 G frequency band Wi-Fi interface is supported.

55. The CP determines, according to the resolution of the media content that the user requests to play, the capability information of the MS, and the capability information of the MR, an operating frequency band used for transmitting the media content. For example, for the foregoing UHD media content, the CP determines that using a current Wi-Fi network may occupy large bandwidth and cause unsmooth playback, and both the MS and the MR support a high frequency band (for example, 60 GHz), so the CP determines to use a 60 GHz wireless connection to perform transmission. For another example, for the foregoing FHD resolution content, if at least one of the MS and the MR currently accesses a wireless local area network by using 2.4 GHz, the CP determines, according to a preset policy and/or a current status of available bandwidth of a wireless network, that 5 GHz can meet a requirement of smooth playback, and if both the MS and the MR support 5 GHz, determines to use a 5 GHz wireless connection to perform transmission.

56. The CP generates a parameter configuration to be used by the MS and the MR for transmitting data in 60 GHz, and delivers the parameter configuration to the MS and the MR separately by using an existing connection, commanding the MS and the MR to use the parameter configuration to establish a connection in the 60 GHz frequency band and transmit the media content that the user requests to play.

The foregoing parameter configuration may include but is not limited to one or more of the following parameters: an enabled physical interface (PHY, 802.11 ad), a frequency band identifier (Channel IDs, 5), a peer device ID (for example, a MAC address), a network ID (SSID), an encryption mode (for example, WPA2), and a key.

For example, the CP may carry the foregoing parameter configuration by using a UPnP action, for example, carry the foregoing parameter configuration by using newly defined SetPHYForStream( ), which is specifically described as follows:

```
<PHYInterface>
<Enable>802.11ad-60G</Enable>
<ChannelIDs>1 5</ChannelIDs>
<PeerID>01-23-45-67-89-ab</PeerID>
<MediaURLs>http://192.168.1.10/video/movie/ABC.avi</MediaURLs>
...
<PHY Interface>
```

The CP delivers, in the foregoing manner, the parameter configuration required by the MS and the MR for establishing a connection in the 60 GHz frequency band. This is advantageous to quickly establishing a connection by the MS and the MR, and reducing a waiting delay for the user.

57. After the MS and the MR receive the parameter configuration delivered by the CP, if the physical interface corresponding to the 60 GHz is not working, the MS and the MR enable the physical interface, search for the peer device according to the parameter configuration, establish a wireless connection, and allocate an IP address to the physical interface. By using the Hypertext Transfer Protocol (HTTP), the MR acquires, from a uniform resource locator (URL) on the MS, the media content that the user requests to play, and plays the media content.

It should be noted herein that, the MS and/or the MR may further perform any one or more of the following processing steps.

(1) If the peer end cannot be searched out by using 60 GHz or signals are weak, the MS and the MR may fall back to a previous connection manner.

(2) To reduce an initial waiting time of the MR before playing, the MR may, before switching to 60 GHz, first acquire, over an existing Wi-Fi connection, data of first several seconds (for example, first 5 s) of the media content that the user requests to play, and play the data. If the MR supports simultaneous working in two frequency bands, the MR may further acquire, by using the existing Wi-Fi connection, data of the media content that the user requests to play, until the MR establishes a connection with the MS in 60 GHz and starts to transmit data.

(3) To save energy, after transmission of the media content requested by the user is completed, the MR and the MS may automatically disable the connection established in the 60 GHz frequency band, and the corresponding physical interface.

In this embodiment, when the resolution of the media content that the user requests to play is high, the CP determines, according to capabilities of the MS and the MR, to perform transmission in the 60 GHz frequency band, then generates a related parameter configuration, and delivers the parameter configuration to the MS and the MR, so that the MS and the MR establish a wireless connection in the 60 GHz frequency band and perform media content transmission. Thereby, an advantage of the 60 GHz frequency band or a similar high frequency band whose bandwidth may be as high as 7 Gbit/s is fully used, which is advantageous to improving transmission quality and playback quality of media content of a high resolution. In addition, problems of poor penetration and large power consumption of the 60 GHz frequency band or similar high frequency band are taken into account, and the 60 GHz frequency band or similar high frequency band is not always used but is used only when necessary, which is advantageous to saving power of the MS and the MR.

In the foregoing embodiment, both the MS and the MR access the WLAN by means of Wi-Fi by using 2.4 GHz or 5 GHz, but are not limited thereto. In another scenario, one of the MS and the MR is connected to a router by using a wired connection (for example, an Ethernet, a power line, or a cable, and the other one, for example, the MR, is connected to the router by means of Wi-Fi. Generally, bandwidth of a wired connection is stable, and the wired connection is not easily susceptible to interference, and also does not easily interfere with other devices. Therefore, it is unnecessary to switch to a 60 GHz wireless connection. In this case, in the foregoing step 54, the CP needs to acquire capability information of a router in the home network by defining a UPnP action, for example, GetPHYInfo( ). Optionally, capability information of a device that is connected to the router in a wired manner may not be acquired. If it is found that the router supports a wireless protocol (for example, 802.11ad) applicable to transmission of a high definition video, and that the MR also supports the same protocol, an 802.11ad parameter configuration is simultaneously sent to the router and the MR in the foregoing step 56. Therefore, in step 57, the MR uses 60 GHz to access the local area network in which the router is located, uses the previously accessed IP address, and then acquires, from the MS, the media content that the user requests to play, and plays the media content.

It should be noted herein that, the embodiment shown in FIG. 5 uses the 802.11ad-60 GHz and DLNA protocols as an example, but is not limited thereto. The method provided by the embodiment of the present disclosure is also applicable to other 802.11 protocols, for example, 802.11n/ac-5 GHz, and other media transmission protocols, for example, AirPlay, IGRS, RTSP, and File Transfer Protocol (FTP). In addition, the embodiment shown in FIG. 5 uses 3-Box as an example, but is also applicable to 2-Box Push and 2-Box Pull. When the technical solution of the present disclosure is implemented in 2-Box Push and 2-Box Pull, communication between the CP and the MS and between the CP and the MR are correspondingly replaced with internal interfaces of a device.

Figure 6:
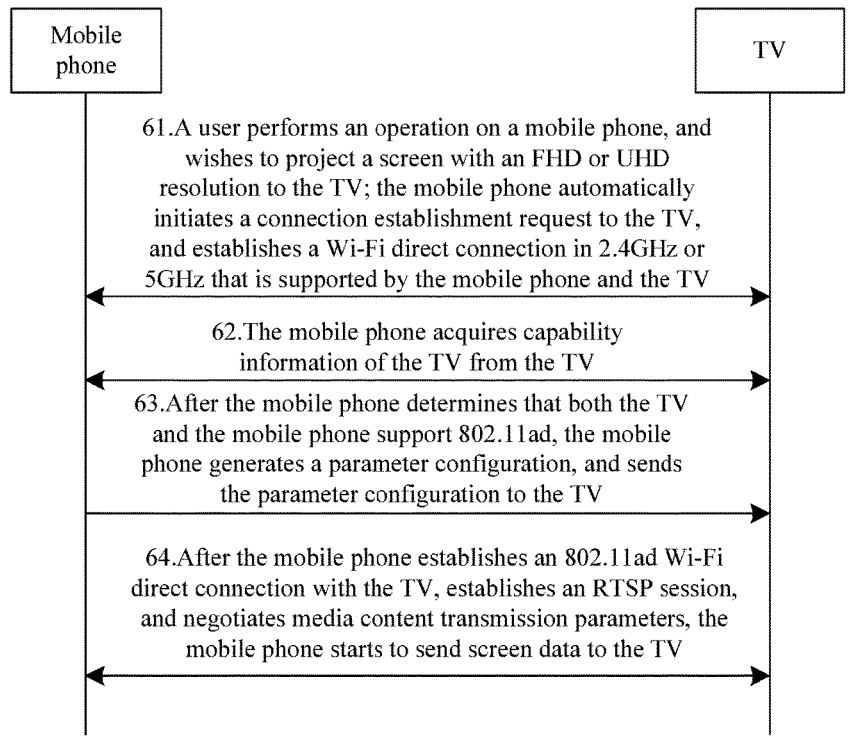
FIG. 6 is a flowchart of still another media data transmission method according to an embodiment of the present disclosure.

The following uses the WFD protocol as an example for description. In an application scenario, the WFD protocol requires that a source device, for example, a mobile phone, and a receiver device, for example, a TV, should establish a direct connection by using the Wi-Fi Direct protocol, and then establish an RTSP connection, negotiate media transmission parameters by using the RTSP protocol, for example, encoding, a data rate, and a synchronization clock, and start data transmission to implement sharing of a mobile phone screen to the TV. As shown in FIG. 6, a media data transmission method implemented by using the technical solution of the present disclosure includes the following steps.

61. A user performs an operation on a mobile phone, and wishes to project a screen with an FHD or UHD resolution to a TV. In this case, the mobile phone automatically initiates a connection establishment request to the TV, and establishes a Wi-Fi Direct connection in 2.4 GHz or 5 GHz that is supported by the mobile phone and the TV.

62. The mobile phone acquires capability information of the TV from the TV, for example, whether 802.11ad is supported, and a corresponding physical interface when 802.11ad is supported.

This step may be sent by using the UPnP action in the embodiment shown in FIG. 5, or may be implemented at a Wi-Fi MAC layer, or may be implemented by using an RTSP message (for example, an OPTION method).

63. After the mobile phone determines that both the TV and the mobile phone support 802.11ad, the mobile phone generates a parameter configuration, and sends the parameter configuration to the TV.

This step may be sent by using the UPnP action in the embodiment shown in FIG. 5, or may be implemented at a Wi-Fi MAC layer, or may be implemented by using an RTSP message (for example, an OPTION method).

64. After the mobile phone establishes an 802.11ad Wi-Fi Direct connection with the TV, establishes an RTSP session, and negotiates media content transmission parameters, the mobile phone starts to send screen data to the TV.

It should be noted herein that, the mobile phone and/or the TV may further perform any one or more of the following optional processing steps.

(1) If the peer end cannot be searched out by using 60 GHz, or signals are weak, the mobile phone and the TV may fall back to a previous connection manner, for example, 2.4 GHz or 5 GHz.

(2) To reduce an initial waiting time in screen sharing, the mobile phone may, before switching to 60 GHz, first push screen data over an existing Wi-Fi connection for several seconds (for example, 5 s). If the mobile phone and the TV support simultaneous working in two frequency bands, the mobile phone may further send screen data by using the existing Wi-Fi connection, until the mobile phone establishes a connection with the TV in 60 GHz and starts to transmit screen data.

(3) To save energy, after transmission of the screen data completed, the mobile phone and the TV may automatically disable the connection in 60 GHz, and the corresponding physical interface.

In this embodiment, when the user needs to transmit the screen of the mobile phone to the TV for displaying, the mobile phone determines, according to capabilities of the mobile phone and the TV, to perform transmission in the 60 GHz frequency band, then generates a related parameter configuration, and delivers the parameter configuration to the TV, so that the mobile phone establishes a wireless connection in the 60 GHz frequency band with the TV and performs screen data transmission. Thereby, an advantage of the 60 GHz frequency band or a similar high frequency band whose bandwidth may be as high as 7 Gbit/s is fully used, which is advantageous to improving transmission quality and playback quality of the screen data. In addition, problems of poor penetration and large power consumption of the 60 GHz frequency band or similar high frequency band are taken into account, and the 60 GHz frequency band or similar high frequency band is not always used but is used only when necessary, which is advantageous to saving power of the mobile phone and the TV.

Figure 7:
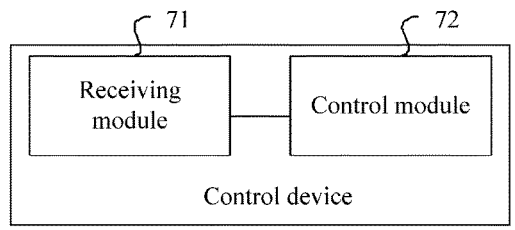
FIG. 7 is a schematic structural diagram of a control device according to an embodiment of the present disclosure.

FIG. 7 is a schematic structural diagram of a control device according to an embodiment of the present disclosure. As shown in FIG. 7, the control device includes a receiving module 71 and a control module 72.

The receiving module 71 is configured to receive a play instruction, where the play instruction is used to instruct a media presentation device to request to acquire first media content from a media source device.

The control module 72 is configured to, when it is determined that the first media content indicated by the play instruction belongs to a first type of media data, and that at least one of the media source device and the media presentation device uses a second frequency band to access a wireless local area network, or when it is determined that the first media content indicated by the play instruction belongs to a first type of media data, and that the media source device and the media presentation device use a second frequency band to directly establish a connection, control the media source device and the media presentation device to establish a connection in a first frequency band and transmit the first media content based on the connection, where the second frequency band is different from the first frequency band.

Figure 8:
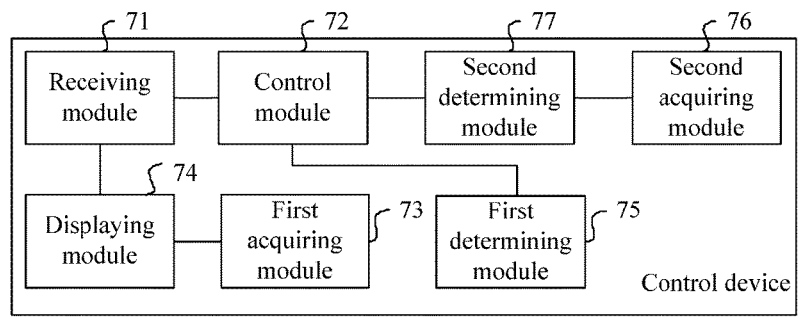
FIG. 8 is a schematic structural diagram of another control device according to an embodiment of the present disclosure.

In an optional implementation manner, as shown in FIG. 8, the control device further includes a first acquiring module 73 and a displaying module 74.

The first acquiring module 73 is configured to acquire a media information list from the media source device, where the media information list includes at least an identifier of the first media content.

The displaying module 74 is configured to display the media information list acquired by the first acquiring module 73.

Based on the foregoing description, the receiving module 71 may be configured to receive the play instruction that is sent when a user selects the first media content according to the media information list.

In an optional implementation manner, as shown in FIG. 8, the control device further includes a first determining module 75.

The first determining module 75 is configured to compare a resolution of the first media content with a resolution threshold corresponding to the first type of media data; and if the resolution of the first media content is greater than or equal to the resolution threshold, determine that the first media content belongs to the first type of media data, and determine that at least one of the media source device and the media presentation device uses the second frequency band to access the wireless local area network. Optionally, the first determining module 75 is connected to the control module 72, and configured to provide the foregoing determining result for the control module 72.

In an optional implementation manner, as shown in FIG. 8, the control device further includes a second acquiring module 76 and a second determining module 77.

The second acquiring module 76 is configured to acquire capability information of the media source device and/or capability information of the media presentation device.

The second determining module 77 is configured to determine, according to the capability information of the media source device and/or the capability information of the media presentation device, which are/is acquired by the second acquiring module 76, that the media source device and the media presentation device may establish the connection in the first frequency band. The second determining module 77 is connected to the control module 72, and configured to provide the foregoing determining result for the control module 72.

Based on the foregoing description, the control module 72 is configured to, when it is determined that the first media content belongs to the first type of media data, and that at least one of the media source device and the media presentation device uses the second frequency band to access the wireless local area network, and the second determining module 77 determines that the media source device and the media presentation device may establish the connection in the first frequency band, or when it is determined that the first media content belongs to the first type of media data, and that the media source device and the media presentation device use the second frequency band to directly establish the connection, and the second determining module 77 determines that the media source device and the media presentation device may establish the connection in the first frequency band, control the media source device and the media presentation device to establish the connection in the first frequency band and transmit the first media content based on the connection.

In an optional implementation manner, the second acquiring module 76 is configured to, when one of the media source device and the media presentation device uses the second frequency band to access the wireless local area network, and the other one is connected to a router in the wireless local area network in a wired manner, acquire the capability information of the device using the second frequency band to access the wireless local area network, in the media source device and the media presentation device, and capability information of the router. Correspondingly, the second determining module 77 is configured to determine, according to the capability information of the device using the second frequency band to access the wireless local area network, in the media source device and the media presentation device, and the capability information of the router, that the device using the second frequency band to access the wireless local area network, in the media source device and the media presentation device, and the router may establish a connection in the first frequency band.

In an optional implementation manner, the control module 72 is configured to, when it is determined that the first media content belongs to the first type of media data, and that both the media source device and the media presentation device use the second frequency band to access the wireless local area network, or when it is determined that the first media content belongs to the first type of media data, and that the media source device and the media presentation device use the second frequency band to directly establish the connection, generate a parameter configuration used by the media source device and the media presentation device for transmitting the first media content in the first frequency band, and send the parameter configuration to the media source device and the media presentation device, so that the media source device and the media presentation device establish the connection in the first frequency band and transmit the first media content based on the connection; or the control module 72 is configured to, when it is determined that the first media content belongs to the first type of media data, and that one of the media source device and the media presentation device uses the second frequency band to access the wireless local area network, and that the other one is connected to the router in the wireless local area network in the wired manner, generate a parameter configuration used by the media source device and the media presentation device for transmitting the first media content in the first frequency band, and send the parameter configuration to the device using the second frequency band to access the wireless local area network, in the media source device and the media presentation device, and the router, so that the media source device and the media presentation device establish the connection in the first frequency band by using the router and transmit the first media content based on the connection.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, when the parameter configuration is sent to the media source device, the parameter configuration includes but is not limited to the following information: a frequency band identifier (Channel ID) of the first frequency band, a physical interface (PHY) corresponding to the first frequency band, an identifier of the media presentation device, and an identifier of the wireless local area network. When the parameter configuration is sent to the media presentation device, the parameter configuration includes but is not limited to the following information: a frequency band identifier (Channel ID) of the first frequency band, a physical interface (PHY) corresponding to the first frequency band, an identifier of the media source device, and an identifier of the wireless local area network. As the first frequency band varies, the frequency band identifier of the first frequency band and the corresponding physical interface may also vary. The identifier of the media source device or media presentation device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Each functional module of the control device provided by this embodiment may be configured to execute the procedure of the method embodiment shown in FIG. 1A or FIG. 1B, and its specific operating principle is not further described herein. For details, reference may be made to the description of the method embodiment.

When it is determined that media content that needs to be played belongs to a first type of media data, and that at least one of a media source device and a media presentation device uses a second frequency band to access a wireless local area network, or when it is determined that media content that needs to be played belongs to a first type of media data, and that a media source device and a media presentation device use a second frequency band to directly establish a connection, the control device provided by this embodiment controls the media source device and the media presentation device to switch an operating frequency band from the second frequency band to a first frequency band suitable for transmitting the first type of media data, so that the media source device and the media presentation device establish a connection in the first frequency band and complete transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of the first type of media data. Further, the control device in this embodiment controls the media source device and the media presentation device to transmit the first type of media data in the first frequency band, which is also advantageous to reducing interference on an existing service in the second frequency band.

Figure 9:
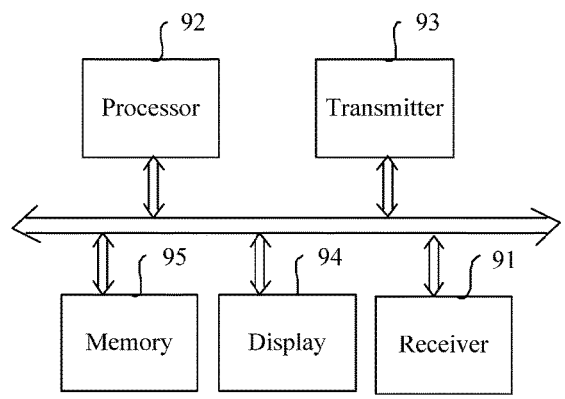
FIG. 9 is a schematic structural diagram of still another control device according to an embodiment of the present disclosure.

FIG. 9 is a schematic structural diagram of still another control device according to an embodiment of the present disclosure. As shown in FIG. 9, the control device includes a receiver 91 and a processor 92.

The receiver 91 is configured to receive a play instruction, where the play instruction is used to instruct a media presentation device to request to acquire first media content from a media source device.

The processor 92 is configured to, when it is determined that the first media content indicated by the play instruction belongs to a first type of media data, and that at least one of the media source device and the media presentation device uses a second frequency band to access a wireless local area network, or when it is determined that the first media content indicated by the play instruction belongs to a first type of media data, and that the media source device and the media presentation device use a second frequency band to directly establish a connection, control the media source device and the media presentation device to establish a connection in a first frequency band and transmit the first media content based on the connection, where the second frequency band is different from the first frequency band.

The processor 92 may be a central processing unit (CPU), or an application specific integrated circuit (ASIC), or is configured as one or more integrated circuits for implementing the embodiment of the present disclosure.

In an optional implementation manner, the receiver 91 is further configured to acquire a media information list from the media source device, where the media information list includes at least an identifier of the first media content.

As shown in FIG. 9, the control device further includes a display 94. The display 94 is configured to display the media information list acquired by the receiver 91, so that a user selects the first media content. Based on this, that the receiver 91 receives a play instruction includes that the receiver 91 may be configured to receive the play instruction that is sent when the user selects the first media content according to the media information list.

In an optional implementation manner, the processor 92 is further configured to compare a resolution of the first media content with a resolution threshold corresponding to the first type of media data; and if the resolution of the first media content is greater than or equal to the resolution threshold, determine that the first media content belongs to the first type of media data, and determine that at least one of the media source device and the media presentation device uses the second frequency band to access the wireless local area network.

Further, the receiver 91 is further configured to acquire capability information of the media source device and/or capability information of the media presentation device. The processor 92 is further configured to determine, according to the capability information of the media source device and/or the capability information of the media presentation device, which are/is acquired by the receiver 91, that the media source device and the media presentation device may establish the connection in the first frequency band.

Based on the foregoing description, the processor 92 is configured to, when it is determined that the first media content belongs to the first type of media data, and that at least one of the media source device and the media presentation device uses the second frequency band to access the wireless local area network, and it is determined that the media source device and the media presentation device may establish the connection in the first frequency band, or when it is determined that the first media content belongs to the first type of media data, and that the media source device and the media presentation device use the second frequency band to directly establish the connection, and it is determined that the media source device and the media presentation device may establish the connection in the first frequency band, control the media source device and the media presentation device to establish the connection in the first frequency band and transmit the first media content based on the connection.

In an optional implementation manner, the receiver 91 is configured to, when one of the media source device and the media presentation device uses the second frequency band to access the wireless local area network, and the other one is connected to a router in the wireless local area network in a wired manner, acquire the capability information of the device using the second frequency band to access the wireless local area network, in the media source device and the media presentation device, and capability information of the router. That the processor 92 is configured to determine, according to the capability information of the media source device and/or the capability information of the media presentation device, that the media source device and the media presentation device may establish the connection in the first frequency band, includes that the processor 92 is configured to determine, according to the capability information of the device using the second frequency band to access the wireless local area network, in the media source device and the media presentation device, and the capability information of the router, that the device using the second frequency band to access the wireless local area network, in the media source device and the media presentation device, and the router may establish a connection in the first frequency band.

In an optional implementation manner, as shown in FIG. 9, the control device further includes a transmitter 93. The processor 92 is configured to, when it is determined that the first media content belongs to the first type of media data, and that both the media source device and the media presentation device use the second frequency band to access the wireless local area network, or when it is determined that the first media content belongs to the first type of media data, and that the media source device and the media presentation device use the second frequency band to directly establish the connection, generate a parameter configuration used by the media source device and the media presentation device for transmitting the first media content in the first frequency band, and send the parameter configuration to the media source device and the media presentation device by using the transmitter 93, so that the media source device and the media presentation device establish the connection in the first frequency band and transmit the first media content based on the connection; or the processor 92 is configured to, when it is determined that the first media content belongs to the first type of media data, and that one of the media source device and the media presentation device uses the second frequency band to access the wireless local area network, and that the other one is connected to the router in the wireless local area network in the wired manner, generate a parameter configuration used by the media source device and the media presentation device for transmitting the first media content in the first frequency band, and send, by using the transmitter 93, the parameter configuration to the device using the second frequency band to access the wireless local area network, in the media source device and the media presentation device, and the router, so that the media source device and the media presentation device establish the connection in the first frequency band by using the router and transmit the first media content based on the connection. Correspondingly, the transmitter 93 may be configured to send the parameter configuration to the media source device and the media presentation device, or the transmitter 93 is further configured to send the parameter configuration to the device using the second frequency band to access the wireless local area network, in the media source device and the media presentation device, and the router.

Further, as shown in FIG. 9, the control device further includes a memory 95. The memory 95 is configured to store a program. The program may include program code, where the program code includes a computer operation instruction. Optionally, the processor 92 may be configured to execute the program to implement the foregoing functions, but is not limited thereto.

The memory 95 may include a high-speed random access memory (RAM), or may include a non-volatile memory, for example, at least one disk storage.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, when the parameter configuration is sent to the media source device, the parameter configuration includes but is not limited to the following information: a frequency band identifier (Channel ID) of the first frequency band, a physical interface (PHY) corresponding to the first frequency band, an identifier of the media presentation device, and an identifier of the wireless local area network. When the parameter configuration is sent to the media presentation device, the parameter configuration includes but is not limited to the following information: a frequency band identifier (Channel ID) of the first frequency band, a physical interface (PHY) corresponding to the first frequency band, an identifier of the media source device, and an identifier of the wireless local area network. As the first frequency band varies, the frequency band identifier of the first frequency band and the corresponding physical interface may also vary. The identifier of the media source device or media presentation device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Optionally, in an implementation, if the receiver 91, processor 92, transmitter 93, display 94, and memory 95 are implemented independently, the receiver 91, processor 92, transmitter 93, display 94, and memory 95 may be interconnected by a bus and implement mutual communication. The bus may be an industry standard architecture (ISA) bus, a peripheral component interconnect (PCI) bus, or an extended industry standard architecture (EISA) bus, or the like. The bus may be categorized as an address bus, a data bus, a control bus, or the like. For ease of indicating, the bus in FIG. 9 is indicated only by a bold line, which does not mean that only one bus or one type of bus exists.

Optionally, in an implementation, if the receiver 91, processor 92, transmitter 93, display 94, and memory 95 are integrated into one chip for implementation, the receiver 91, processor 92, transmitter 93, display 94, and memory 95 may implement mutual communication 的 through internal interfaces.

The control device provided by this embodiment may be configured to execute the procedure of the method embodiment shown in FIG. 1A or FIG. 1B, and its specific operating principle is not further described herein. For details, reference may be made to the description of the method embodiment.

When it is determined that media content that needs to be played belongs to a first type of media data, and that at least one of a media source device and a media presentation device uses a second frequency band to access a wireless local area network, or when it is determined that media content that needs to be played belongs to a first type of media data, and that a media source device and a media presentation device use a second frequency band to directly establish a connection, the control device provided by this embodiment controls the media source device and the media presentation device to switch an operating frequency band from the second frequency band to a first frequency band suitable for transmitting the first type of media data, so that the media source device and the media presentation device establish a connection in the first frequency band and complete transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of the first type of media data. Further, the control device in this embodiment controls the media source device and the media presentation device to transmit the first type of media data in the first frequency band, which is also advantageous to reducing interference on an existing service in the second frequency band.

Figure 10A:
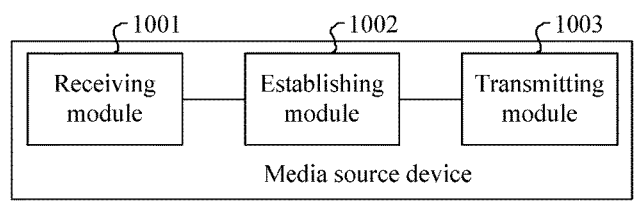
FIG. 10A is a schematic structural diagram of a media source device according to an embodiment of the present disclosure.

FIG. 10A is a schematic structural diagram of a media source device according to an embodiment of the present disclosure. As shown in FIG. 10A, the media source device includes a receiving module 1001, an establishing module 1002, and a transmitting module 1003.

The receiving module 1001 is configured to receive a control instruction from a control device, where the control instruction is sent when the control device determines that first media content that needs to be sent by the media source device to a media presentation device belongs to a first type of media data, and that at least one of the media source device and the media presentation device uses a second frequency band to access a wireless local area network, or determines that first media content that needs to be sent by the media source device to a media presentation device belongs to a first type of media data, and that the media source device and the media presentation device use a second frequency band to directly establish a connection.

The establishing module 1002 is configured to establish a connection in a first frequency band with the media presentation device according to the control instruction received by the receiving module 1001, where the second frequency band is different from the first frequency band.

The transmitting module 1003 is connected to the establishing module 1002, and configured to transmit the first media content to the media presentation device by using the connection established by the establishing module 1002 in the first frequency band.

In an optional implementation manner, the control instruction from the control device is a parameter configuration used by the media source device and the media presentation device for transmitting the first media content in the first frequency band. Based on this, the receiving module 1001 may be configured to receive the parameter configuration sent by the control device.

Figure 10B:
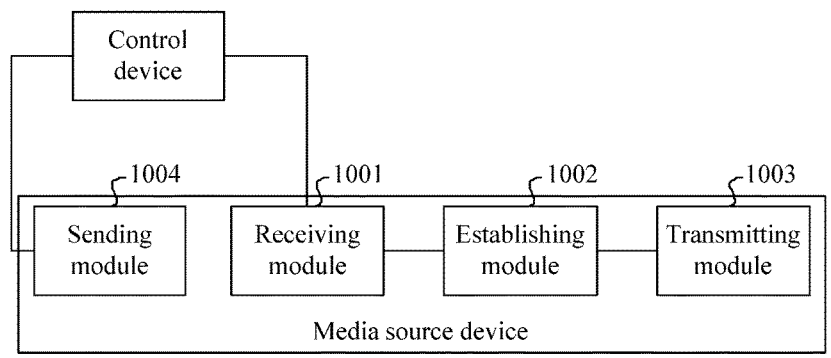
FIG. 10B is a schematic structural diagram of another media source device according to an embodiment of the present disclosure.

In an optional implementation manner, as shown in FIG. 10B, the media source device further includes a sending module 1004. The sending module 1004 is configured to provide capability information of the media source device for the control device before the establishing module 1002 establishes the connection in the first frequency band with the media presentation device. For example, the sending module 1004 may provide the capability information of the media source device for the control device by using the UPnP protocol.

In an optional implementation manner, the transmitting module 1003 is configured to, before the media source device establishes the connection in the first frequency band with the media presentation device, transmit some data of the first media content to the media presentation device by using the connection established in the second frequency band with the media presentation device, and after the media source device establishes the connection in the first frequency band with the media presentation device, transmit other data of the first media content to the media presentation device by using the connection established in the first frequency band, where the other data has not been transmitted by using the connection established in the second frequency band.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, in this embodiment, the parameter configuration is sent to the media source device. Therefore the parameter configuration includes but is not limited to the following information: a frequency band identifier (Channel ID) of the first frequency band, a physical interface (PHY) corresponding to the first frequency band, an identifier of the media presentation device, and an identifier of the wireless local area network. As the first frequency band varies, the frequency band identifier of the first frequency band and the corresponding physical interface may also vary. The identifier of the media presentation device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Each functional module of the media source device provided by this embodiment may be configured to execute the procedure of the method embodiment shown in FIG. 2A or FIG. 2B, and its specific operating principle is not further described herein. For details, reference may be made to the description of the method embodiment.

The media source device provided by this embodiment cooperates with a media presentation device and a control device. Under control of the control device, the media source device switches from a first frequency band to a first frequency band only when media content needs to be transmitted by using the first frequency band, establishes a connection in the first frequency band, and completes transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of a first type of media data. Further, the media source device and the media presentation device provided by this embodiment transmit the first type of media data in the first frequency band, which is also advantageous to reducing interference on an existing service in the second frequency band.

Figure 11:
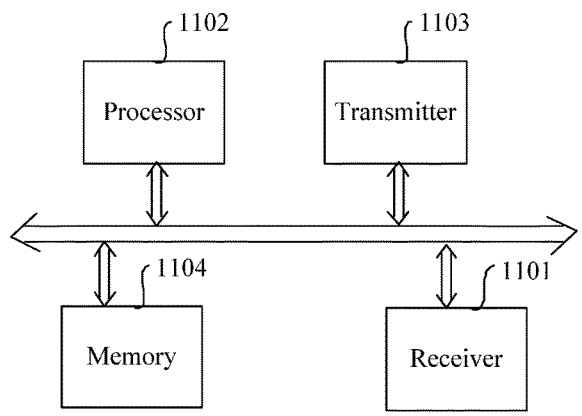
FIG. 11 is a schematic structural diagram of still another media source device according to an embodiment of the present disclosure.

FIG. 11 is a schematic structural diagram of still another media source device according to an embodiment of the present disclosure. As shown in FIG. 11, the media source device includes a receiver 1101, a processor 1102, and a transmitter 1103.

The receiver 1101 is configured to receive a control instruction from a control device, where the control instruction is sent when the control device determines that first media content that needs to be sent by the media source device to a media presentation device belongs to a first type of media data, and that at least one of the media source device and the media presentation device uses a second frequency band to access a wireless local area network, or determines that first media content to be sent by the media source device to a media presentation device belongs to a first type of media data, and that the media source device and the media presentation device use a second frequency band to directly establish a connection.

The processor 1102 is configured to establish a connection in a first frequency band with the media presentation device according to the control instruction received by the receiver 1101, where at least one of the media source device and the media presentation device uses the second frequency band to access the wireless local area network, and the second frequency band is different from the first frequency band.

The processor 1102 may be a CPU or an ASIC, or is configured as one or more integrated circuits for implementing the embodiment of the present disclosure.

The transmitter 1103 is configured to transmit, by using the connection established by the processor 1102 in the first frequency band, the first media content requested by the media presentation device from the media source device, to the media presentation device, where the first media content belongs to the first type of media data.

In an optional implementation manner, the control instruction from the control device is a parameter configuration used by the media source device and the media presentation device for transmitting the first media content in the first frequency band. Based on this, the receiver 1101 may be configured to receive the parameter configuration sent by the control device.

In an optional implementation manner, the transmitter 1103 is further configured to provide capability information of the media source device for the control device before the processor 1102 establishes the connection in the first frequency band with the media presentation device. For example, the transmitter 1103 may provide the capability information of the media source device for the control device by using the UPnP protocol.

In an optional implementation manner, the transmitter 1103 is configured to, before the media source device establishes the connection in the first frequency band with the media presentation device, transmit some data of the first media content to the media presentation device by using the connection established in the second frequency band with the media presentation device, and after the media source device establishes the connection in the first frequency band with the media presentation device, transmit other data of the first media content to the media presentation device by using the connection established in the first frequency band, where the other data has not been transmitted by using the connection established in the second frequency band.

Further, as shown in FIG. 11, the media source device further includes a memory 1104.

The memory 1104 is configured to store a program. The program may include program code, where the program code includes a computer operation instruction. Based on this, the processor 1102 may be configured to execute the program to implement the foregoing functions, but is not limited thereto.

The memory 1104 may include a high-speed RAM, or may include a non-volatile memory, for example, at least one disk storage.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, in this embodiment, the parameter configuration is sent to the media source device. Therefore the parameter configuration includes but is not limited to the following information: a frequency band identifier (Channel ID) of the first frequency band, a physical interface (PHY) corresponding to the first frequency band, an identifier of the media presentation device, and an identifier of the wireless local area network. As the first frequency band varies, the frequency band identifier of the first frequency band and the corresponding physical interface may also vary. The identifier of the media presentation device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Optionally, in an implementation, if the receiver 1101, processor 1102, transmitter 1103, and memory 1104 are implemented independently, the receiver 1101, processor 1102, transmitter 1103, and memory 1104 may be interconnected by a bus and implement mutual communication. The bus may be an ISA bus, a PCI bus, or an EISA bus, or the like. The bus may be categorized as an address bus, a data bus, a control bus, or the like. For ease of indicating, the bus in FIG. 11 is indicated only by a bold line, which does not mean that only one bus or one type of bus exists.

Optionally, in an implementation, if the receiver 1101, processor 1102, transmitter 1103, and memory 1104 are integrated into one chip for implementation, the receiver 1101, processor 1102, transmitter 1103, and memory 1104 may implement mutual communication through internal interfaces.

The media source device provided by this embodiment may be configured to execute the procedure of the method embodiment shown in FIG. 2A or FIG. 2B, and its specific operating principle is not further described herein. For details, reference may be made to the description of the method embodiment.

The media source device provided by this embodiment cooperates with a media presentation device and a control device. Under control of the control device, the media source device switches from a first frequency band to a first frequency band only when media content needs to be transmitted by using the first frequency band, establishes a connection in the first frequency band, and completes transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of a first type of media data. Further, the media source device and the media presentation device provided by this embodiment transmit the first type of media data in the first frequency band, which is also advantageous to reducing interference on an existing service in the second frequency band.

Figure 12A:
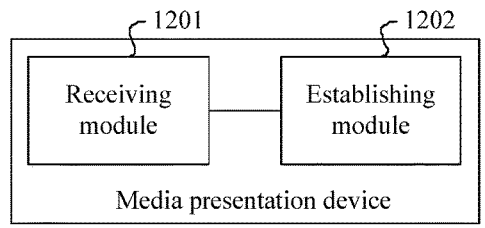
FIG. 12A is a schematic structural diagram of a media presentation device according to an embodiment of the present disclosure.

FIG. 12A is a schematic structural diagram of a media presentation device according to an embodiment of the present disclosure. As shown in FIG. 12A, the media presentation device includes a receiving module 1201 and an establishing module 1202.

The receiving module 1201 is configured to receive a control instruction from a control device, where the control instruction is sent when the control device determines that first media content that needs to be sent by a media source device to the media presentation device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection.

The establishing module 1202 is configured to establish a connection in a first frequency band with the media source device according to the control instruction received by the receiving module 1201, where the second frequency band is different from the first frequency band.

The receiving module 1201 is further configured to receive, by using the connection established by the establishing module 1202 in the first frequency band, the first media content transmitted by the media source device.

In an optional implementation manner, the control instruction from the control device is a parameter configuration used by the media presentation device and the media source device for transmitting the first media content in the first frequency band. Based on this, the receiving module 1201 is configured to receive the parameter configuration sent by the control device.

Based on this, the establishing module 1202 may be configured to establish the connection in the first frequency band with the media source device according to the parameter configuration.

Figure 12B:
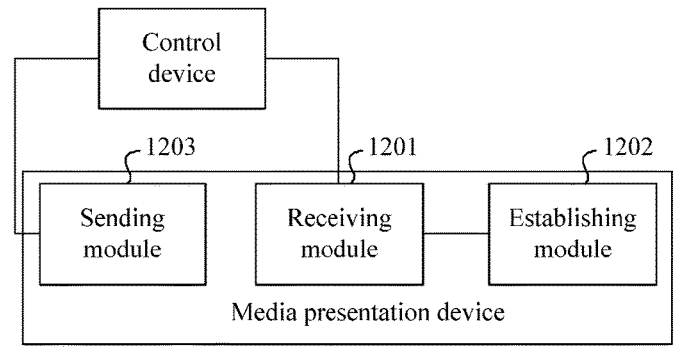
FIG. 12B is a schematic structural diagram of another media presentation device according to an embodiment of the present disclosure.

In an optional implementation manner, as shown in FIG. 12B, the media presentation device further includes a sending module 1203. The sending module 1203 is configured to provide capability information of the media presentation device for the control device before the establishing module 1202 establishes the connection in the first frequency band with the media source device. For example, the sending module 1203 may provide the capability information of the media presentation device for the control device by using the UPnP protocol.

In an optional implementation manner, the receiving module 1201 is configured to, before the media presentation device establishes the connection in the first frequency band with the media source device, receive, by using the connection established in the second frequency band with the media source device, some data of the first media content transmitted by the media source device, and after the media presentation device establishes the connection in the first frequency band with the media source device, receive, by using the connection established in the first frequency band, other data of the first media content transmitted by the media source device, where the other data has not been transmitted by using the connection established in the second frequency band.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, in this embodiment, the parameter configuration is sent to the media presentation device. Therefore the parameter configuration includes but is not limited to the following information: a frequency band identifier (Channel ID) of the first frequency band, a physical interface (PHY) corresponding to the first frequency band, an identifier of the media source device, and an identifier of the wireless local area network. As the first frequency band varies, the frequency band identifier of the first frequency band and the corresponding physical interface may also vary. The identifier of the media source device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Each functional module of the media presentation device provided by this embodiment may be configured to execute the procedure of the method embodiment shown in FIG. 3A or FIG. 3B, and its specific operating principle is not further described herein. For details, reference may be made to the description of the method embodiment.

The media presentation device provided by this embodiment cooperates with a media source device and a control device. Under control of the control device, the media presentation device switches from a first frequency band to a first frequency band only when media content needs to be transmitted by using the first frequency band, establishes a connection in the first frequency band, and completes transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of a first type of media data. Further, the media presentation device and the media source device provided by this embodiment transmit the first type of media data in the first frequency band, which is also advantageous to reducing interference on an existing service in the second frequency band.

Figure 13:
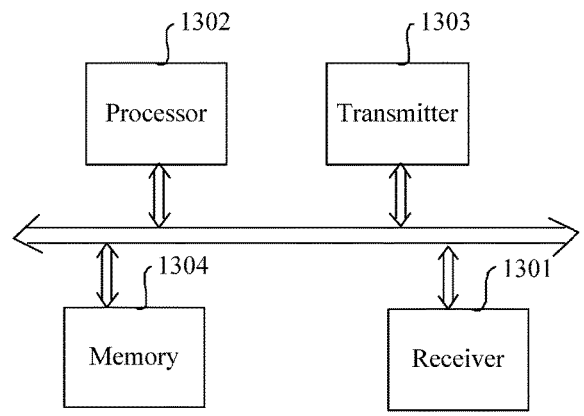
FIG. 13 is a schematic structural diagram of still another media presentation device according to an embodiment of the present disclosure.

FIG. 13 is a schematic structural diagram of still another media presentation device according to an embodiment of the present disclosure. As shown in FIG. 13, the media presentation device includes a receiver 1301 and a processor 1302.

The receiver 1301 is configured to receive a control instruction from a control device, where the control instruction is sent when the control device determines that first media content that needs to be sent by a media source device to the media presentation device belongs to a first type of media data, and that at least one of the media source device and the media presentation device uses a second frequency band to access a wireless local area network, or determines that first media content that needs to be sent by a media source device to the media presentation device belongs to a first type of media data, and that the media source device and the media presentation device use a second frequency band to directly establish a connection.

The processor 1302 is configured to establish a connection in a first frequency band with the media source device according to the control instruction received by the receiver 1301, where the second frequency band is different from the first frequency band.

The processor 1302 may be a CPU or an ASIC, or is configured as one or more integrated circuits for implementing the embodiment of the present disclosure.

The receiver 1301 is further configured to receive, by using the connection established by the processor 1302 in the first frequency band, the first media content transmitted by the media source device.

In an optional implementation manner, the control instruction from the control device is a parameter configuration used by the media presentation device and the media source device for transmitting the first media content in the first frequency band. Based on this, the receiver 1301 may be configured to receive the parameter configuration sent by the control device.

Based on this, the processor 1302 may be configured to establish the connection in the first frequency band with the media source device according to the parameter configuration.

In an optional implementation manner, as shown in FIG. 13, the media presentation device further includes a transmitter 1303. The transmitter 1303 is configured to provide capability information of the media presentation device for the control device before the processor 1302 establishes the connection in the first frequency band with the media source device. For example, the transmitter 1303 may provide the capability information of the media presentation device for the control device by using the UPnP protocol.

In an optional implementation manner, the receiver 1301 is configured to, before the media presentation device establishes the connection in the first frequency band with the media source device, receive, by using the connection established in the second frequency band with the media source device, some data of the first media content transmitted by the media source device, and after the media presentation device establishes the connection in the first frequency band with the media source device, receive, by using the connection established in the first frequency band, other data of the first media content transmitted by the media source device, where the other data has not been transmitted by using the connection established in the second frequency band.

Further, as shown in FIG. 13, the media presentation device further includes a memory 1304.

The memory 1304 is configured to store a program. The program may include program code, where the program code includes a computer operation instruction. Based on this, the processor 1302 may be configured to execute the program to implement the foregoing functions, but is not limited thereto.

The memory 1304 may include a high-speed RAM, or may include a non-volatile memory, for example, at least one disk storage.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, in this embodiment, the parameter configuration is sent to the media presentation device. Therefore the parameter configuration includes but is not limited to the following information: a frequency band identifier (Channel ID) of the first frequency band, a physical interface (PHY) corresponding to the first frequency band, an identifier of the media source device, and an identifier of the wireless local area network. As the first frequency band varies, the frequency band identifier of the first frequency band and the corresponding physical interface may also vary. The identifier of the media source device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Optionally, in an implementation, if the receiver 1301, processor 1302, transmitter 1303, and memory 1304 are implemented independently, the receiver 1301, processor 1302, transmitter 1303, and memory 1304 may be interconnected by a bus and implement mutual communication. The bus may be an ISA bus, a PCI bus, or an EISA bus, or the like. The bus may be categorized as an address bus, a data bus, a control bus, or the like. For ease of indicating, the bus in FIG. 13 is indicated only by a bold line, which does not mean that only one bus or one type of bus exists.

Optionally, in an implementation, if the receiver 1301, processor 1302, transmitter 1303, and memory 1304 are integrated into one chip for implementation, the receiver 1301, processor 1302, transmitter 1303, and memory 1304 may implement mutual communication through internal interfaces.

The media presentation device provided by this embodiment may be configured to execute the procedure of the method embodiment shown in FIG. 3A or FIG. 3B, and its specific operating principle is not further described herein. For details, reference may be made to the description of the method embodiment.

The media presentation device provided by this embodiment cooperates with a media source device and a control device. Under control of the control device, the media presentation device switches from a first frequency band to a first frequency band only when media content needs to be transmitted by using the first frequency band, establishes a connection in the first frequency band, and completes transmission of the media content based on the established connection. Thereby, the first frequency band may not be always used during large power consumption but is used under control of the control device only when media content needs to be transmitted, which is advantageous to saving power of the media source device and the media presentation device and may further improve transmission quality and playback quality of a first type of media data. Further, the media presentation device and the media source device provided by this embodiment transmit the first type of media data in the first frequency band, which is also advantageous to reducing interference on an existing service in the second frequency band.

Figure 14A:
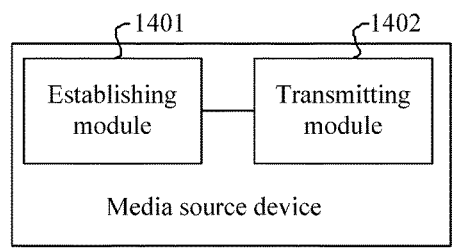
FIG. 14A is a schematic structural diagram of still another media source device according to an embodiment of the present disclosure.

FIG. 14A is a schematic structural diagram of still another media source device according to an embodiment of the present disclosure. As shown in FIG. 14A, the media source device includes an establishing module 1401 and a transmitting module 1402.

The establishing module 1401 is configured to, when it is determined that media content that needs to be transmitted to a media presentation device belongs to a first type of media data, and that at least one of the media source device and the media presentation device uses a second frequency band to access a wireless local area network, or when it is determined that media content that needs to be transmitted to a media presentation device belongs to a first type of media data, and that the media source device and the media presentation device use a second frequency band to directly establish a connection, establish a connection in a first frequency band with the media presentation device, where the second frequency band is different from the first frequency band.

The transmitting module 1402 is configured to transmit the media content to the media presentation device by using the connection established by the establishing module 1401 in the first frequency band.

Figure 14B:
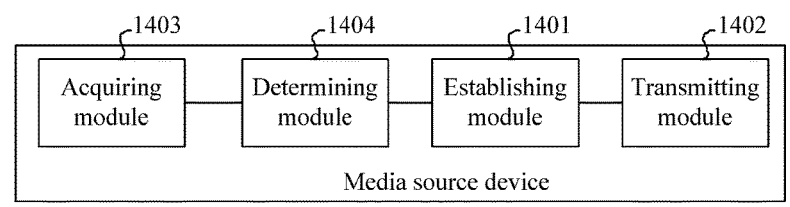
FIG. 14B is a schematic structural diagram of still another media source device according to an embodiment of the present disclosure.

In an optional implementation manner, as shown in FIG. 14B, the media source device further includes an acquiring module 1403 and a determining module 1404.

The acquiring module 1403 is configured to acquire capability information of the media presentation device before the establishing module 1401 establishes the connection in the first frequency band with the media presentation device.

The determining module 1404 is configured to determine, according to capability information of the media source device and/or the capability information of the media presentation device that is acquired by the acquiring module 1403, that the media source device and the media presentation device may establish the connection in the first frequency band. The determining module 1404 is connected to the establishing module 1401, and configured to provide the foregoing determining result for the establishing module 1401.

The establishing module is configured to, when it is determined that the media content that needs to be transmitted to the media presentation device belongs to the first type of media data, and that at least one of the media source device and the media presentation device uses the second frequency band to access the wireless local area network, and the determining module 1404 determines that the media source device and the media presentation device may establish the connection in the first frequency band, or when it is determined that the media content that needs to be transmitted to the media presentation device belongs to the first type of media data, and that the media source device and the media presentation device use the second frequency band to directly establish the connection, and the determining module 1404 determines that the media source device and the media presentation device may establish the connection in the first frequency band, establish the connection in the first frequency band with the media presentation device.

In an optional implementation manner, the establishing module 1401 may be configured to, when it is determined that the media content that needs to be transmitted to the media presentation device belongs to the first type of media data, and that at least one of the media source device and the media presentation device uses the second frequency band to access the wireless local area network, or when it is determined that the media content that needs to be transmitted to the media presentation device belongs to the first type of media data, and that the media source device and the media presentation device use the second frequency band to directly establish the connection, generate a parameter configuration used by the media source device and the media presentation device for transmitting the media content in the first frequency band, and send the parameter configuration to the media presentation device, to establish the connection in the first frequency band with the media presentation device.

In an optional implementation manner, the transmitting module 1402 may be configured to, before the media source device establishes the connection in the first frequency band with the media presentation device, transmit some data of the media content to the media presentation device by using the connection established in the second frequency band between the media source device and the media presentation device, and after the media source device establishes the connection in the first frequency band with the media presentation device, transmit other data of the media content to the media presentation device by using the connection established in the first frequency band, where the other data has not been transmitted by using the connection established in the second frequency band.

In an optional implementation manner, the acquiring module 1403 is configured to acquire the capability information of the media presentation device by using the UPnP protocol; or the acquiring module 1403 is configured to acquire the capability information of the media presentation device by using Wi-Fi MAC layer signaling; or the acquiring module 1403 is configured to acquire the capability information of the media presentation device by using an RTSP message.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, in this embodiment, the parameter configuration is sent to the media presentation device. Therefore the parameter configuration includes but is not limited to the following information: a frequency band identifier (Channel ID) of the first frequency band, a physical interface (PHY) corresponding to the first frequency band, an identifier of the media source device, and an identifier of the wireless local area network. As the first frequency band varies, the frequency band identifier of the first frequency band and the corresponding physical interface may also vary. The identifier of the media source device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Each functional module of the media source device provided by this embodiment may be configured to execute the procedure of the method embodiment shown in FIG. 4A or FIG. 4B, and its specific operating principle is not further described herein. For details, reference may be made to the description of the method embodiment.

When it is determined that media content that a user requests to play belongs to a first type of media data, and that at least one of a media source device and a media presentation device uses a second frequency band to access a wireless local area network, or when it is determined that media content that needs to be transmitted to a media presentation device belongs to a first type of media data, and that a media source device and the media presentation device use a second frequency band to directly establish a connection, the media source device provided by this embodiment establishes a connection in a first frequency band with the media presentation device and completes transmission of the media content based on the established connection. Thereby, the first frequency band may not be always used during large power consumption but is used only when media content needs to be transmitted, which is advantageous to saving power of the media source device and the media presentation device and may further improve transmission quality and playback quality of the first type of media data. Further, the media source device and the media presentation device in this embodiment transmit the first type of media data in the first frequency band, which is also advantageous to reducing interference on an existing service in the second frequency band or a third frequency band.

Figure 15:
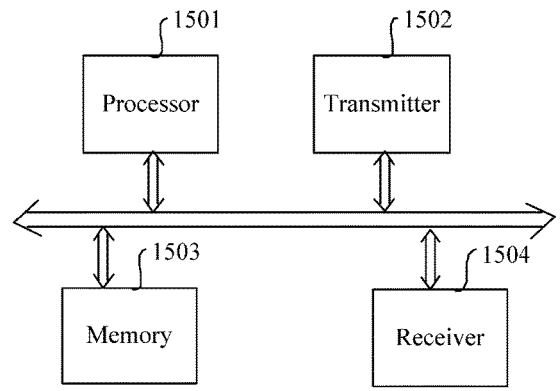
FIG. 15 is a schematic structural diagram of still another media source device according to an embodiment of the present disclosure.

FIG. 15 is a schematic structural diagram of still another media source device according to an embodiment of the present disclosure. As shown in FIG. 15, the media source device includes a processor 1501 and a transmitter 1502.

The processor 1501 is configured to, when it is determined that media content that needs to be transmitted to a media presentation device belongs to a first type of media data, and that at least one of the media source device and the media presentation device uses a second frequency band to access a wireless local area network, or when it is determined that media content that needs to be transmitted to a media presentation device belongs to a first type of media data, and that the media source device and the media presentation device use a second frequency band to directly establish a connection, establish a connection in a first frequency band with the media presentation device, where the second frequency band is different from the first frequency band.

The processor 1501 may be a CPU or an ASIC, or is configured as one or more integrated circuits for implementing the embodiment of the present disclosure.

The transmitter 1502 is configured to transmit the media content to the media presentation device by using the connection established by the processor 1501 in the first frequency band.

In an optional implementation manner, the processor 1501 is further configured to acquire capability information of the media presentation device before the connection is established in the first frequency band with the media presentation device, and determine, according to capability information of the media source device and/or the capability information of the media presentation device, that the media source device and the media presentation device may establish the connection in the first frequency band.

Based on the foregoing description, the processor 1501 is configured to, when it is determined that the media content that needs to be transmitted to the media presentation device belongs to the first type of media data, and that at least one of the media source device and the media presentation device uses the second frequency band to access the wireless local area network, and that the media source device and the media presentation device may establish the connection in the first frequency band, or when it is determined that the media content that needs to be transmitted to the media presentation device belongs to the first type of media data, and that the media source device and the media presentation device use the second frequency band to directly establish the connection, and that the media source device and the media presentation device may establish the connection in the first frequency band, establish the connection in the first frequency band with the media presentation device.

In an optional implementation manner, that the processor 1501 is configured to establish a connection in a first frequency band with the media presentation device includes that the processor 1501 may be configured to, when it is determined that the media content that needs to be transmitted to the media presentation device belongs to the first type of media data, and that at least one of the media source device and the media presentation device uses the second frequency band to access the wireless local area network, or when it is determined that the media content that needs to be transmitted to the media presentation device belongs to the first type of media data, and that the media source device and the media presentation device use the second frequency band to directly establish the connection, generate a parameter configuration used by the media source device and the media presentation device for transmitting the media content in the first frequency band, and send the parameter configuration to the media presentation device by using the transmitter 1502, to establish the connection in the first frequency band with the media presentation device. Correspondingly, the transmitter 1502 is further configured to send the parameter configuration generated by the processor 1501 to the media presentation device.

In an optional implementation manner, the transmitter 1502 may be configured to, before the media source device establishes the connection in the first frequency band with the media presentation device, transmit some data of the media content to the media presentation device by using the connection established in the second frequency band between the media source device and the media presentation device, and after the media source device establishes the connection in the first frequency band with the media presentation device, transmit other data of the media content to the media presentation device by using the connection established in the first frequency band, where the other data has not been transmitted by using the connection established in the second frequency band.

That the processor 1501 acquires capability information of the media presentation device includes that the processor 1501 is configured to acquire the capability information of the media presentation device by using the UPnP protocol; or the processor 1501 is configured to acquire the capability information of the media presentation device by using Wi-Fi MAC layer signaling; or the processor 1501 is configured to acquire the capability information of the media presentation device by using an RTSP message.

Further, as shown in FIG. 15, the media source device further includes a memory 1503.

The memory 1503 is configured to store a program. The program may include program code, where the program code includes a computer operation instruction. Based on this, the processor 1501 may be configured to execute the program to implement the foregoing functions, but is not limited thereto.

The memory 1503 may include a high-speed RAM, or may include a non-volatile memory, for example, at least one disk storage.

Further, as shown in FIG. 15, the media source device further includes a receiver 1504. The receiver 1504 and the transmitter 1502 mutually cooperate to implement communication between the media source device and other devices.

It should be noted herein that, the first type of media data in this embodiment may be high definition media data, full high definition media data, or ultra high definition media data, but is not limited thereto. The high definition media data generally refers to media data whose resolution is 1080×720 (720p). The ultra high definition media data generally refers to media data whose resolution is 3840×2160 (4K) or 7680×4320 (8K). The full high definition media data generally refers to media data whose resolution is 1920×1080 (1080p).

In this embodiment, if the first type of media data is media data requiring large transmission bandwidth, for example, high definition media data, full high definition media data, or ultra high definition media data, frequencies in the first frequency band are higher than frequencies in the second frequency band, so that larger bandwidth is provided. For example, the second frequency band may be 2.4 GHz, and the first frequency band may be 5 GHz, 60 GHz, or 45 GHz; or the second frequency band may be 5 GHz, and the first frequency band may be 45 GHz or 60 GHz or a higher frequency band.

It should be noted herein that, in this embodiment, the parameter configuration is sent to the media presentation device. Therefore, the parameter configuration includes but is not limited to the following information: a frequency band identifier (Channel ID) of the first frequency band, a physical interface (PHY) corresponding to the first frequency band, an identifier of the media source device, and an identifier of the wireless local area network. As the first frequency band varies, the frequency band identifier of the first frequency band and the corresponding physical interface may also vary. The identifier of the media source device may be information that may uniquely identify the device, such as a MAC address. For example, if the media source device and the media presentation device establish the connection in the first frequency band in a direct connection manner (that is, without using the router), the identifier of the wireless local area network may be but is not limited to an SSID.

Optionally, in an implementation, if the processor 1501, transmitter 1502, memory 1503, and receiver 1504 are implemented independently, the processor 1501, transmitter 1502, memory 1503, and receiver 1504 may be interconnected by a bus and implement mutual communication. The bus may be an ISA bus, a PCI bus, or an EISA bus, or the like. The bus may be categorized as an address bus, a data bus, a control bus, or the like. For ease of indicating, the bus in FIG. 15 is indicated only by a bold line, which does not mean that only one bus or one type of bus exists.

Optionally, in an implementation, if the processor 1501, transmitter 1502, memory 1503, and receiver 1504 are integrated into one chip for implementation, the processor 1501, transmitter 1502, memory 1503, and receiver 1504 may implement mutual communication through internal interfaces.

The media source device provided by this embodiment may be configured to execute the procedure of the method embodiment shown in FIG. 4A or FIG. 4B, and its specific operating principle is not further described herein. For details, reference may be made to the description of the method embodiment.

When it is determined that media content that a user requests to play belongs to a first type of media data, and that at least one of a media source device and a media presentation device uses a second frequency band to access a wireless local area network, or when it is determined that media content that needs to be transmitted to a media presentation device belongs to a first type of media data, and that a media source device and the media presentation device use a second frequency band to directly establish a connection, the media source device provided by this embodiment establishes a connection in a first frequency band with the media presentation device and completes transmission of the media content based on the established connection. Thereby, the first frequency band may not be always used during large power consumption but is used only when media content needs to be transmitted, which is advantageous to saving power of the media source device and the media presentation device and may further improve transmission quality and playback quality of the first type of media data. Further, the media source device and the media presentation device in this embodiment transmit the first type of media data in the first frequency band, which is also advantageous to reducing interference on an existing service in the second frequency band or a third frequency band.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. A media data transmission method, comprising:
   receiving a play instruction, wherein the play instruction is used to instruct a media presentation device to request to acquire first media content from a media source device; and
   controlling the media source device and the media presentation device to establish a connection in a first frequency band so that the first media content is transmitted based on the connection when at least one of the following two conditions is met:
      the first media content belongs to a first type of media data, and the media presentation device uses a second frequency band to access a wireless local area network; or
      the first media content belongs to the first type of media data, and the media source device and the media presentation device use the second frequency band to directly establish a connection,
   wherein the second frequency band is different from the first frequency band.

2. The method according to claim 1, wherein receiving the play instruction comprises:
   acquiring a media information list from the media source device, wherein the media information list comprises at least an identifier of the first media content;
   displaying the media information list; and
   receiving the play instruction that is sent when a user selects the first media content according to the media information list.

3. The method according to claim 1, wherein determining that the first media content belongs to the first type of media data comprises:
   comparing a resolution of the first media content with a resolution threshold corresponding to the first type of media data; and determining that the first media content belongs to the first type of media data when the resolution of the first media content is higher than or equal to the resolution threshold.

4. The method according to claim 1, wherein before controlling the media source device and the media presentation device to establish the connection in the first frequency band, the method further comprises:
acquiring capability information of the media source device and/or capability information of the media presentation device, and
determining, according to the capability information of the media source device and/or the capability information of the media presentation device, that the media source device and the media presentation device may establish the connection in the first frequency band.

5. The method according to claim 4, wherein one of the media source device and the media presentation device uses the second frequency band to access the wireless local area network, wherein the other of the media source device and the media presentation device is connected to a router in the wireless local area network in a wired manner, and wherein acquiring capability information of the media source device and/or capability information of the media presentation device, and determining, according to the capability information of the media source device and/or the capability information of the media presentation device, that the media source device and the media presentation device may establish the connection in the first frequency band, comprises:
acquiring the capability information of the one of the devices using the second frequency band to access the wireless local area network, in the media source device and the media presentation device, and capability information of the router; and
determining, according to the capability information of the one of the devices using the second frequency band to access the wireless local area network, in the media source device and the media presentation device, and the capability information of the router, that the devices using the second frequency band to access the wireless local area network, in the media source device and the media presentation device, and the router may establish the connection in the first frequency band.

6. The method according to claim 1, wherein controlling the media source device and the media presentation device to establish the connection in the first frequency band so that the first media content is transmitted based on the connection comprises:
generating a parameter configuration used by the media source device and the media presentation device for transmitting the first media content in the first frequency band, and
sending the parameter configuration to the media source device and the media presentation device so that the media source device and the media presentation device establish the connection in the first frequency band and transmit the first media content based on the connection, and
wherein at least one of the following conditions is met:
the first media content belongs to the first type of media data, and both the media source device and the media presentation device use the second frequency band to access the wireless local area network; or
the first media content belongs to the first type of media data, and the media source device and the media presentation device use the second frequency band to directly establish connectivity.

7. The method according to claim 1, wherein controlling the media source device and the media presentation device to establish the connection in the first frequency band so that the first media content is transmitted based on the connection comprises:
generating a parameter configuration used by the media source device and the media presentation device for transmitting the first media content in the first frequency band, and
sending the parameter configuration to the one of the devices using the second frequency band to access the wireless local area network, in the media source device and the media presentation device, and the router so that the media source device and the media presentation device establish the connection in the first frequency band using the router and transmit the first media content based on the connection,
wherein the first media content belongs to the first type of media data,
wherein one of the media source device and the media presentation device uses the second frequency band to access the wireless local area network, and
wherein the other media source device is connected to the router in the wireless local area network in the wired manner.

8. A media data transmission method, comprising:
establishing, by a media source device, a connection in a first frequency band with a media presentation device, wherein a second frequency band is different from the first frequency band; and
transmitting, by the media source device and using the connection established in the first frequency band, the media content to the media presentation device,
wherein at least one of the following two conditions is met:
the media source device determines that media content that needs to be transmitted to a media presentation device belongs to a first type of media data, and the media presentation device uses a second frequency band to access a wireless local area network; or
the media source device determines that media content that needs to be transmitted to the media presentation device belongs to the first type of media data, and the media source device and the media presentation device use the second frequency band to directly establish a connection.

9. A control device, comprising:
a receiver configured to receive a play instruction, wherein the play instruction is used to instruct a media presentation device to request to acquire first media content from a media source device; and
a processor coupled to the receiver and configured to control the media source device and the media presentation device to establish a connection in a first frequency band so that the first media content is transmitted based on the connection, wherein a second frequency band is different from the first frequency band,
wherein at least one of the following two conditions is met:
the first media content belongs to a first type of media data, and the media presentation device uses the second frequency band to access a wireless local area network; or
the first media content belongs to the first type of media data, and the media source device and the media presentation device use the second frequency band to directly establish the connection.

10. The control device according to claim 9, wherein the receiver is further configured to receive a media information list from the media source device, wherein the media information list comprises at least an identifier of the first media content, wherein the control device further comprises a display device coupled to the processor and configured to display the media information list, and wherein the receiver is further configured to receive the play instruction that is sent when a user selects the first media content according to the media information list.

11. The control device according to claim 9, wherein the processor is further configured to:
compare a resolution of the first media content with a resolution threshold corresponding to the first type of media data;
determine that the first media content belongs to the first type of media data when the resolution of the first media content is higher than or equal to the resolution threshold; and
determine that at least one of the media source device and the media presentation device uses the second frequency band to access the wireless local area network when the resolution of the first media content is higher than or equal to the resolution threshold.

12. The control device according to claim 9, wherein the receiver is further configured to receive capability information of at least one of the media source device and/or capability information of the media presentation device, wherein the processor is further configured to determine, according to the capability information of at least one of the media source device and/or the capability information of the media presentation device, that the media source device and the media presentation device may establish the connection in the first frequency band, wherein the processor is further configured to control the media source device and the media presentation device to establish the connection in the first frequency band and transmit the first media content based on the connection, and wherein at least one of the following two conditions is met:
the first media content belongs to the first type of media data, at least one of the media source device and the media presentation device uses the second frequency band to access the wireless local area network, and the media source device and the media presentation device are capable of establishing the connection in the first frequency band; or
the first media content belongs to the first type of media data, the media source device and the media presentation device use the second frequency band to directly establish the connection, and the media source device and the media presentation device are capable of establishing the connection in the first frequency band.

13. The control device according to claim 12, wherein the receiver is further configured to acquire the capability information of the one of the devices using the second frequency band to access the wireless local area network, in the media source device and the media presentation device, and capability information of the router when one of the media source device and the media presentation device uses the second frequency band to access the wireless local area network, and the other of the media source device and the media presentation device is connected to a router in the wireless local area network in a wired manner, and wherein the processor is further configured to determine, according to the capability information of the one of the devices using the second frequency band to access the wireless local area network, in the media source device and the media presentation device, and the capability information of the router, that the one of the devices using the second frequency band to access the wireless local area network, in the media source device and the media presentation device, and the router may establish the connection in the first frequency band.

14. The control device according to claim 9, wherein the processor is further configured to:
generate a parameter configuration used by the media source device and the media presentation device for transmitting the first media content in the first frequency band; and send the parameter configuration to the media source device and the media presentation device so that the media source device and the media presentation device establish the connection in the first frequency band and transmit the first media content based on the connection, and
wherein at least one of the following two conditions is met:
the first media content belongs to the first type of media data, and both the media source device and the media presentation device use the second frequency band to access the wireless local area network; or
the first media content belongs to the first type of media data, and the media source device and the media presentation device use the second frequency band to directly establish connectivity.

15. The control device according to claim 9, wherein the processor is further configured to:
generate a parameter configuration used by the media source device and the media presentation device for transmitting the first media content in the first frequency band; and
send the parameter configuration to the one of the devices using the second frequency band to access the wireless local area network and to the router so that the media source device and the media presentation device establish the connection in the first frequency band using the router and transmit the first media content based on the connection,
wherein the first media content belongs to the first type of media data,
wherein one of the media source device and the media presentation device uses the second frequency band to access the wireless local area network, and
wherein the other of the media source device and the media presentation device is connected to a router in the wireless local area network in a wired manner.

16. The control device according to claim 15, wherein the parameter configuration comprises a frequency band identifier of the first frequency band and an identifier of the media presentation device when the parameter configuration is sent to the media source device.

17. The control device according to claim 15, wherein the parameter configuration comprises a frequency band identifier of the first frequency band and an identifier of the media source device when the parameter configuration is sent to the media presentation device.

* * * * *